(12) United States Patent
Hattori et al.

(10) Patent No.: US 7,101,046 B2
(45) Date of Patent: Sep. 5, 2006

(54) KALEIDOSCOPE AND IMAGE MATERIAL ASSEMBLY FOR KALEIDOSCOPE

(76) Inventors: Keiji Hattori, 10-13-13 Yachiyodai-nishi, Yachiyo (JP); Taeko Hattori, 10-13-13 Yachiyodai-nishi, Yachiyo (JP)

( * ) Notice: Subject to any disclaimer, the term of this patent is extended or adjusted under 35 U.S.C. 154(b) by 0 days.

(21) Appl. No.: 10/641,223

(22) Filed: Aug. 13, 2003

(65) Prior Publication Data

US 2004/0032662 A1 Feb. 19, 2004

(30) Foreign Application Priority Data

Aug. 14, 2002 (JP) ............................ 2002-236192

(51) Int. Cl.
*G03B 21/00* (2006.01)
*G02B 27/08* (2006.01)

(52) U.S. Cl. ............................ 353/1; 353/2; 359/616; 359/617

(58) Field of Classification Search ............... 353/1, 353/2; 359/616, 617, 850, 856, 857, 861; 362/368, 225, 257; 472/63
See application file for complete search history.

(56) References Cited

U.S. PATENT DOCUMENTS

| 4,612,583 | A | * | 9/1986 | Ayervais | 348/832 |
| 4,815,801 | A | * | 3/1989 | Anderson | 359/616 |
| 5,020,870 | A | * | 6/1991 | Gray | 359/616 |
| 5,029,954 | A | * | 7/1991 | Eilrich et al. | 359/617 |
| 5,054,865 | A | * | 10/1991 | Huang | 359/617 |
| 5,172,270 | A | * | 12/1992 | Peiperl | 359/617 |
| 5,223,889 | A | * | 6/1993 | Mouner | 355/43 |
| 5,984,480 | A | * | 11/1999 | Wong | 359/617 |
| 6,305,808 | B1 | * | 10/2001 | Ochi | 359/616 |
| 2003/0076597 | A1 | * | 4/2003 | Chang | 359/617 |

* cited by examiner

*Primary Examiner*—Melissa Jan Koval
(74) *Attorney, Agent, or Firm*—Jordan and Hamburg LLP

(57) ABSTRACT

A kaleidoscope includes a kaleidoscope body assembled in the shape of a sleeve so as to locate surfaces of mirrors therein and a support body, having two concave parts, attached to an end portion of the kaleidoscope body and supporting an image material assembly at the end portion. A retaining member is attached to one of the support body, the end portion of the kaleidoscope body and a part adjacent the support body and kaleidoscope body, to prevent the image material assembly from falling from an opening end of the concave parts. The image material assembly is supported rotatably and detachably by the support body so that it can change from the image material assembly attached in the kaleidoscope body to a different image material assembly.

13 Claims, 36 Drawing Sheets

KALEIDOSCOPE AND IMAGE MATERIAL ASSEMBLY FOR KALEIDOSCOPE

BACKGROUND OF THE INVENTION

This invention relates to a kaleidoscope and an image material assembly for the kaleidoscope.

A conventional kaleidoscope is composed of a kaleidoscope body having two or more mirrors and an image material assembly attached fixedly to an end portion of the kaleidoscope body. In the conventional kaleidoscope natural light enters into the kaleidoscope body from outside of the image material assembly.

Since the image material assembly of the conventional kaleidoscope is attached fixedly in the kaleidoscope body, it is hard to exchange to the image material assembly, and enjoyment is reduced because the user cannot easily change the image material assembly.

Moreover, the user cannot enjoy original beauty of the image of the kaleidoscope in a room because the inner space becomes too dark in order to see the image material assembly by natural light. Moreover, since it is necessary to twist the body towards light, it is difficult to enjoy oneself for a long time.

SUMMARY OF THE INVENTION

Accordingly, it is an object of the invention to provide a kaleidoscope which can change from an image material assembly attached in the kaleidoscope body to the different image material assembly easily and can enjoy many images.

It is another object of the invention to provide a kaleidoscope that can produce a bright and beautiful image anywhere by attaching a small lighting device to carry conveniently.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

DETAILED DESCRIPTION OF THE PREFERRED EMBODIMENTS

Preferred embodiments of the present invention are described in more detail below with reference to the accompanying drawings.

Figure 1:
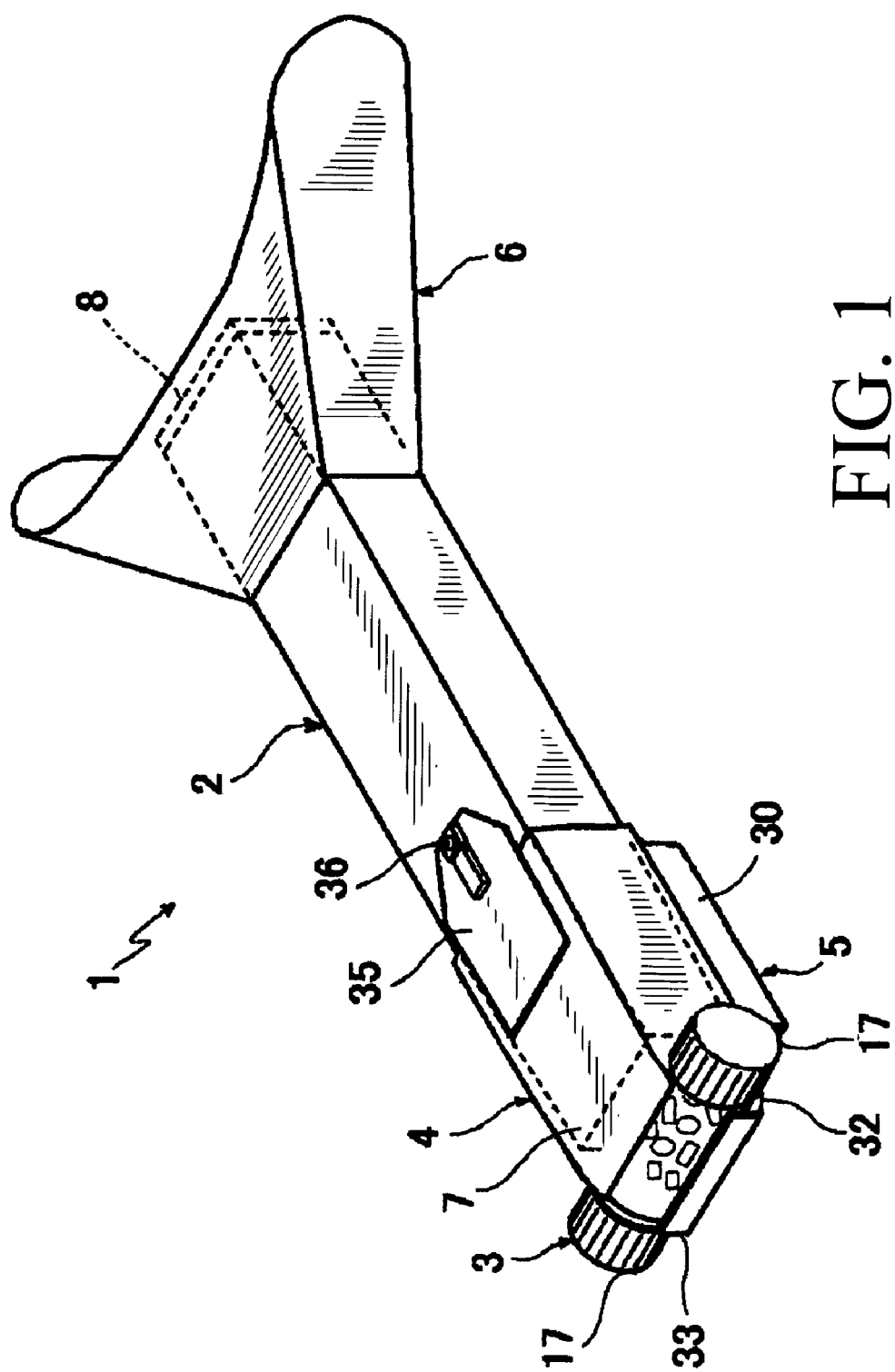
FIG. 1 is a perspective view showing a first embodiment of the present invention.
Figure 2:
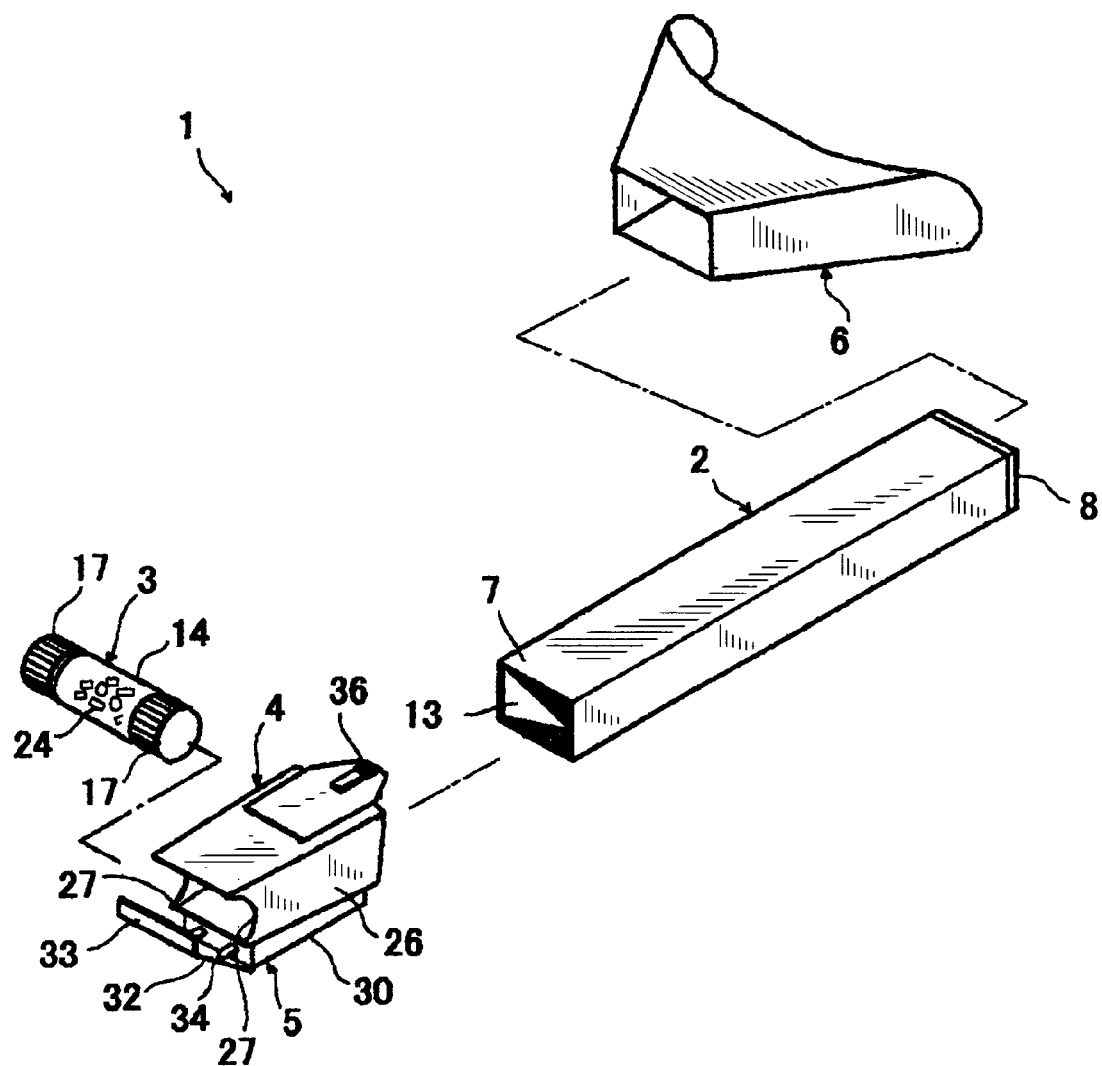
FIG. 2 is an exploded perspective view.

An understanding of the present invention may be best gained by reference to FIGS. 1 and 2. The numeral 1 shows a kaleidoscope of the present invention comprised of a kaleidoscope body 2; a support body 4 for supporting an image material assembly 3 at an end portion 7 of the kaleidoscope body 2 mounted rotatably and detachably to the end portion 7 of the kaleidoscope body 2; a lighting device 5 attached in the support body 4, capable of illuminating the image material assembly 3 for kaleidoscope from a right angle position mostly to the direction of an axial center of the kaleidoscope body 2; and an eye cover 6 attached to a window 8 of the kaleidoscope body 2, capable of covering both eyes when looking through the window 8 by one of eyes.

Figure 7:
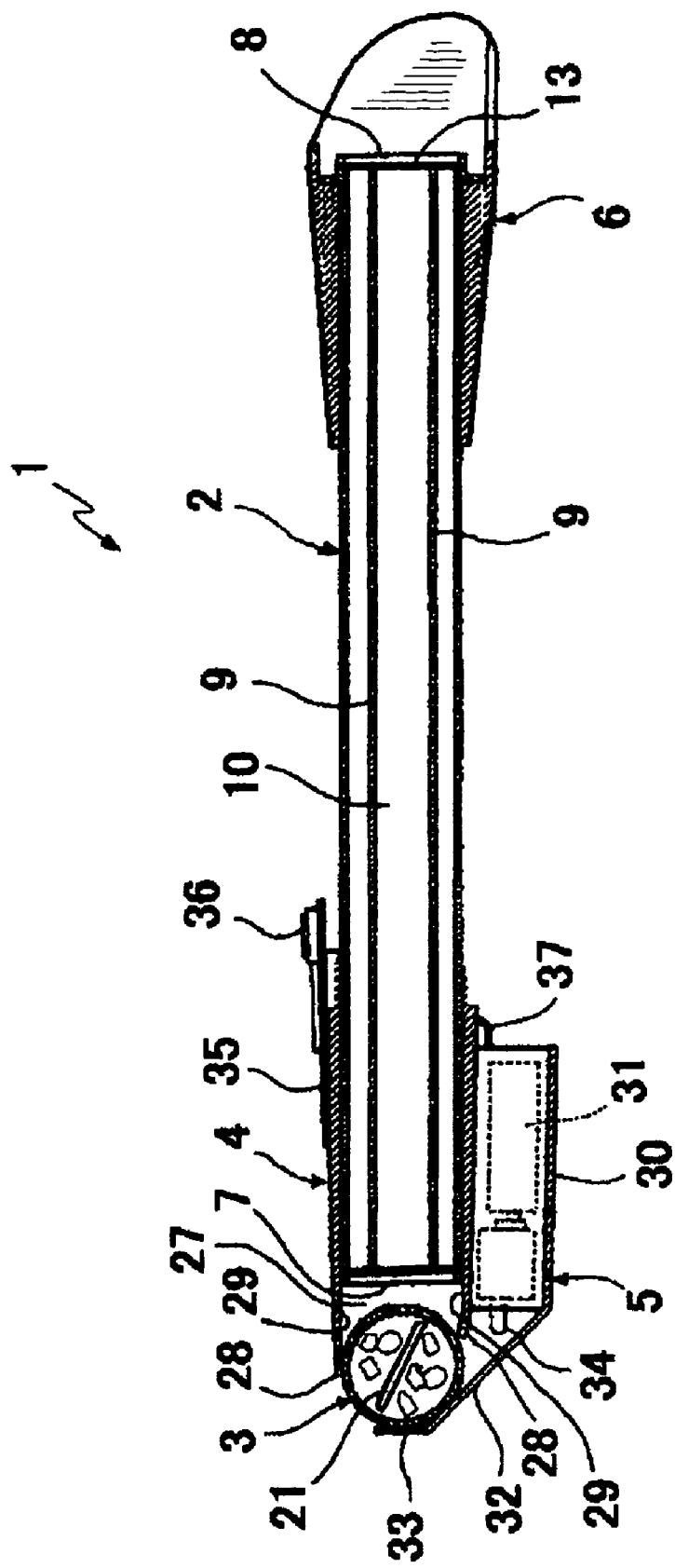
FIG. 7 is a cross sectional view taken along a line 7—7 of FIG. 3.
Figure 8:
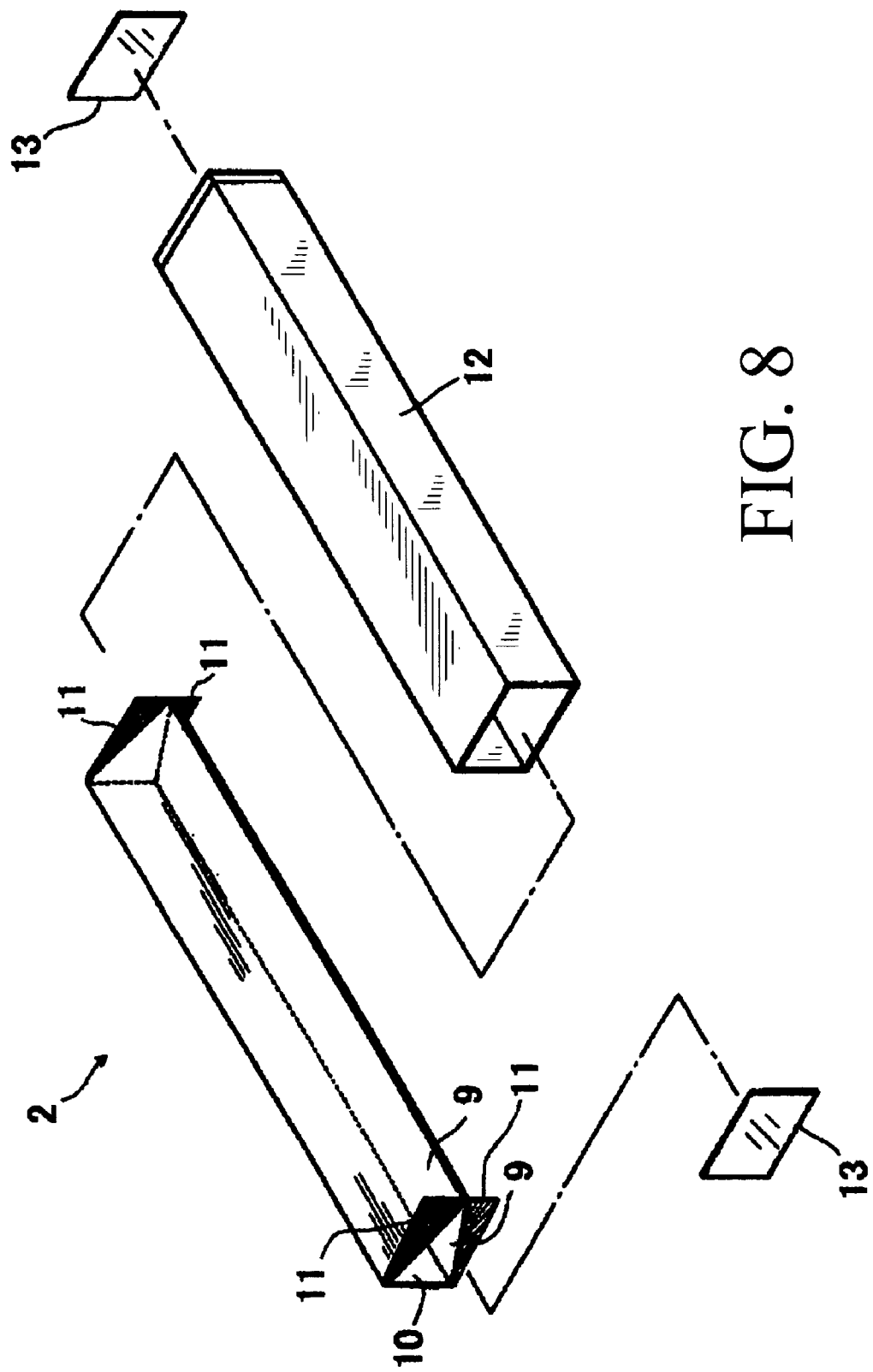
FIG. 8 is an exploded perspective view of a kaleidoscope body.

Referring to FIGS. 7 and 8, a plurality of mirrors, three mirrors 9, 9, 10 are assembled in the shape of a triangle and pipe so as to position mirror surfaces at an inner wall therein. Shields 11 are attached to the both ends of the piped mirrors 9, 9, 10 so as to cover a space between end portions of the mirrors 9, 9, and an inner wall of a sleeve 12. After the assembled mirrors 9, 9, 10 are inserted into the sleeve 12, openings positioned at ends of the sleeve 12 are covered by cover glasses 13, 13.

In this structure, since a whole surface of the opening of the sleeve 12 may be used, a big peep mouth is secured, and it is effective in peeping easily.

The mirrors 9, 9 and 10 are inserted into the sleeve 12 of the kaleidoscope body 2. A gas without oxygen and inactive gas are provided in the sleeve 12 if needed, and the sleeve 12 is sealed with the cover glasses 13.

When a mirror-plating surface is used directly as a reflective part, the mirror-plating surface is exposed by the atmosphere, and degradation by the rust from oxidization tends to take place.

Removal of oxygen is required in order to prevent the degradation of the mirrored surface, and use of a drier and oxygen absorbent can produce the same effect.

Referring to FIGS. 2, 3, 9 and 10, the image material assembly 3 is comprised of a container body 14 formed in the shape of a cylinder and made by transparent glass or resin material; an image material medium 24 having objects 22 and a liquid 23; a partition 21; pieces 25; caps 17; and a spacer 20.

The image material assembly medium 24 includes the objects 22 including a plurality of beads, glasses, plastic, precious metals, threads and the like, contained in the container body 14 and the liquid 23 including colored or transparent glycerin, oil, water and the like.

A partition 21 divides an interior of the container body 14 into two or more spaces. Pieces 25 having elasticity are contained into the container body 14.

The cap 17 covers the opening 15 of the container body 14 at a sealing state, and guide slots 19 are formed between the shoulder part 16 and the caps 17 respectively.

The spacer 20 is attached to the opposite portion of the opening of the container body 14.

In the image material assembly 3 for the kaleidoscope, the liquid 23 including glycerin, oil, water and the like is enclosed with in many cases because the coloring of the object 22 is maintained and the effects such as enjoying the process for changing the image with slow motion are expected.

However, air bubbles remain in the process for sealing the cap 17, and there is a problem that the beauty of an image is spoiled.

In this invention, after the liquid 23 with the object 22 is filled in the container body 14 up to the opening 15, the pieces 25 with elasticity, the pieces formed in the shape of a pillar corresponding to the diameter of the opening 15 and made of styrene foam in this embodiment are packed into the container body 14. Then the cap 17 is closed so that the pieces 25 are pushed thereinto, and it is closed with eliminating the air bubbles inside the container with a liquid 23. Therefore, the cap 17 packs the pieces 25, which are elastic, and in the process air bubbles remaining in the image material assembly 3 is prevented, and the fine sight of the image can be secured.

Moreover, the liquid 23 which is enclosed in the image material assembly 3 expands and the pressure rises by the rise of temperature etc. Therefore, there is a problem that leaking out of the liquid exists. On the contrary, although the expansion of the liquid can be offset by contraction of air and the leaking of the liquid can be prevented if air is put in to some quantity, the beauty of the image is spoiled with air bubbles. In the conventional way, the mouth of a glass container is melted down, or a metal cap is covered and closed in order to prevent the liquid leak. Although it is a positive method technically, it is not easy to process.

In this case, a bag of air contracts and expands in volume by change of the pressure inside the container or the pieces 25 with elasticity including foaming resin material or foaming rubber material are filled into the container body 14 with the liquid 23 so that the expansion of the liquid 23 is offset, and the leaking of the liquid is prevented.

When the pieces 25 are put into the opening 15 of the transparent container body 14, the pieces can be hid inside the opaque cap 17, and do not contribute to the image of the image material assembly 3.

In addition, the quantity of the image material assembly medium 24 may be adjusted economically by packing the elastic pieces 25.

The image of the image material assembly 3 is mostly decided by the composition of the image material assembly medium 24. The conventional image material assembly is only supplied with the image material assembly medium 24 of the container, and almost same image continues when it rotates.

In the present invention, a partition formed in the shape of a plate, cross, Y-letter, and the like, is provided by a partition wall 21 formed in the shape of a plate in this embodiment, and is provided in the container body 14, and different objects 22 are put into each space formed by the partition wall 21. Therefore, when the image material assembly is rotated, there is an advantage that gives change to an image.

When the number of division increases, more varying images result. Moreover, since the partition 21 constitutes a background, the changeable image can be shown by treating color and a pattern to the partition 21.

Especially, when a cylinder or a pillar is put in the center of the container and the image material assembly medium 24 is put into around it, the quantity of the part image material assembly medium 24 can be decreased economically.

The guide slots 19 of the image material assembly 3 allow the image material assembly 3 to rotate at a fixed position along concave parts 27 of the support body 4 as a guide rail.

In this way, the guide slots 19 prevent falling out of the image material assembly 3 from the support body 4. Therefore, when the projection and concave portions are formed on the outer circumferential part of the image material assembly 3, it can achieve the function retention.

When the position of the projection and concave portions is formed freely, the image software 3 can move to an axle direction. Therefore, a more varying image is obtained from the same image material assembly 3. Moreover, since the caps 17 are attached to the both sides of the image material assembly 3, the user can rotate it at both sides by hand.

In addition, the cap 17 can be used to rotate rotates the image material assembly 3.

Figure 3:
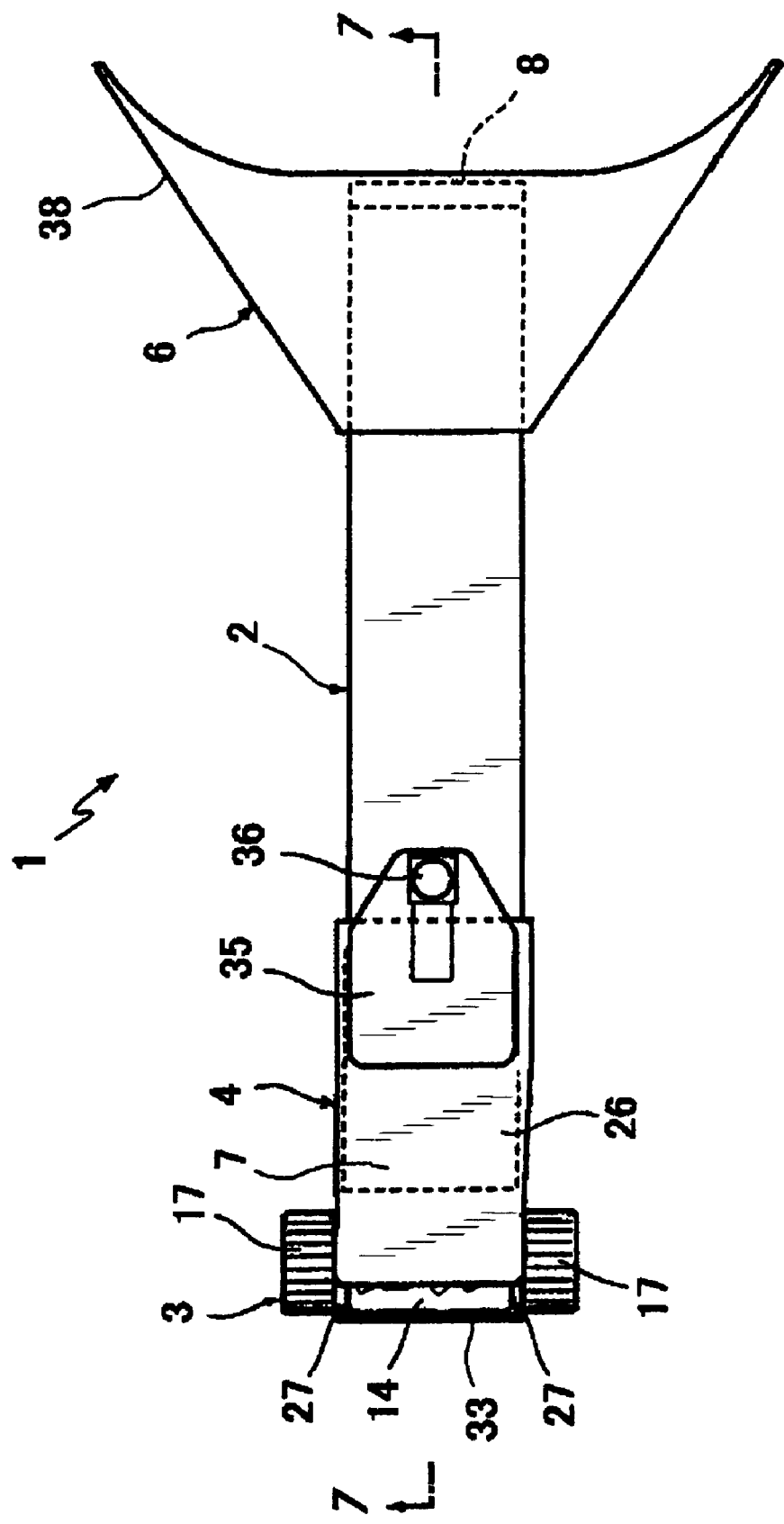
FIG. 3 is a top view.
Figure 4:
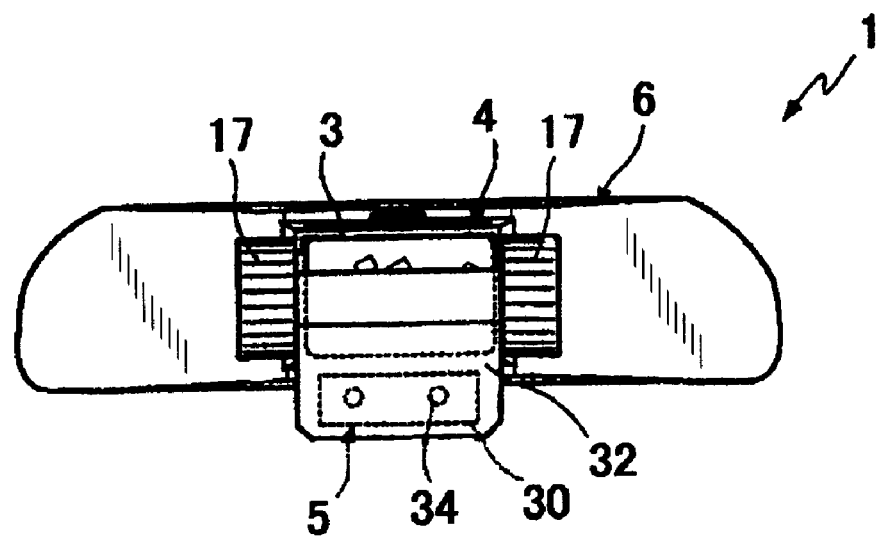
FIG. 4 is a front view.
Figure 5:
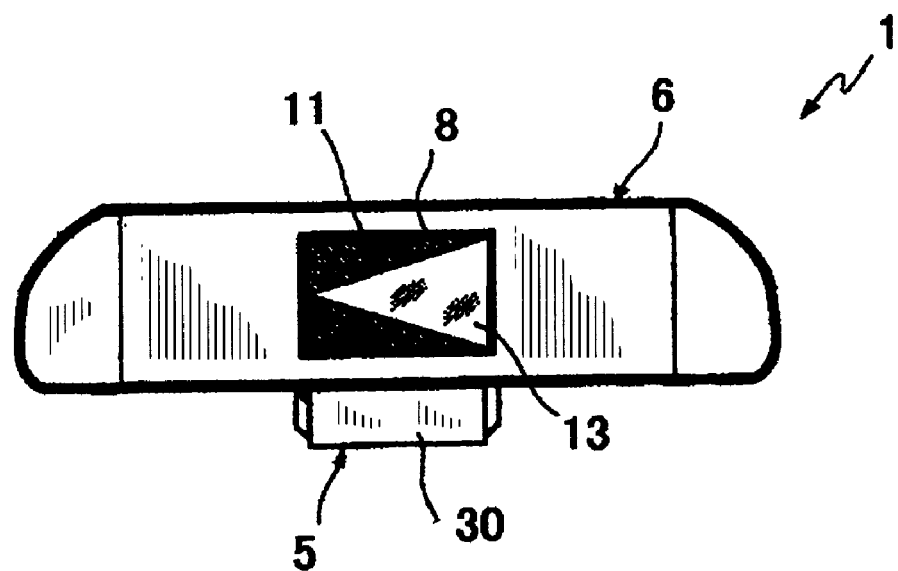
FIG. 5 is a back view.
Figure 6:
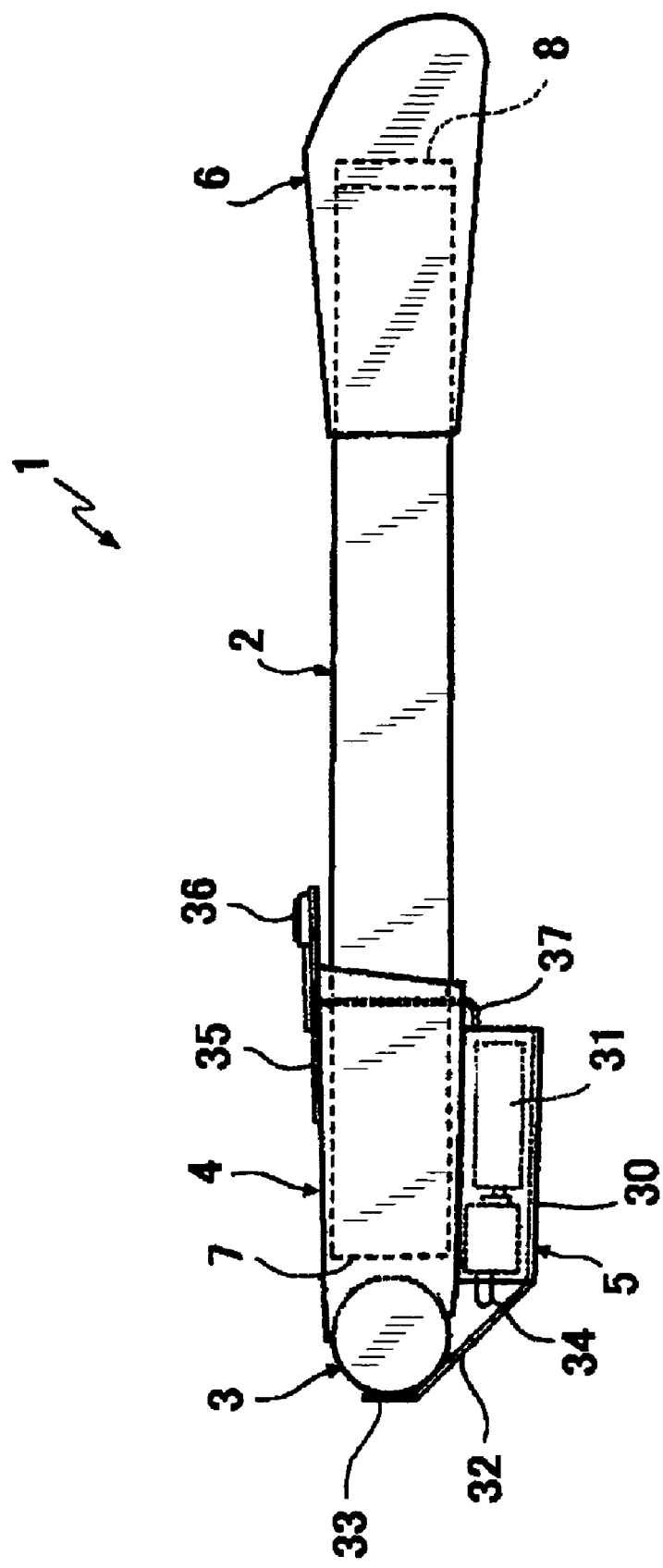
FIG. 6 is a side view.
Figure 11:
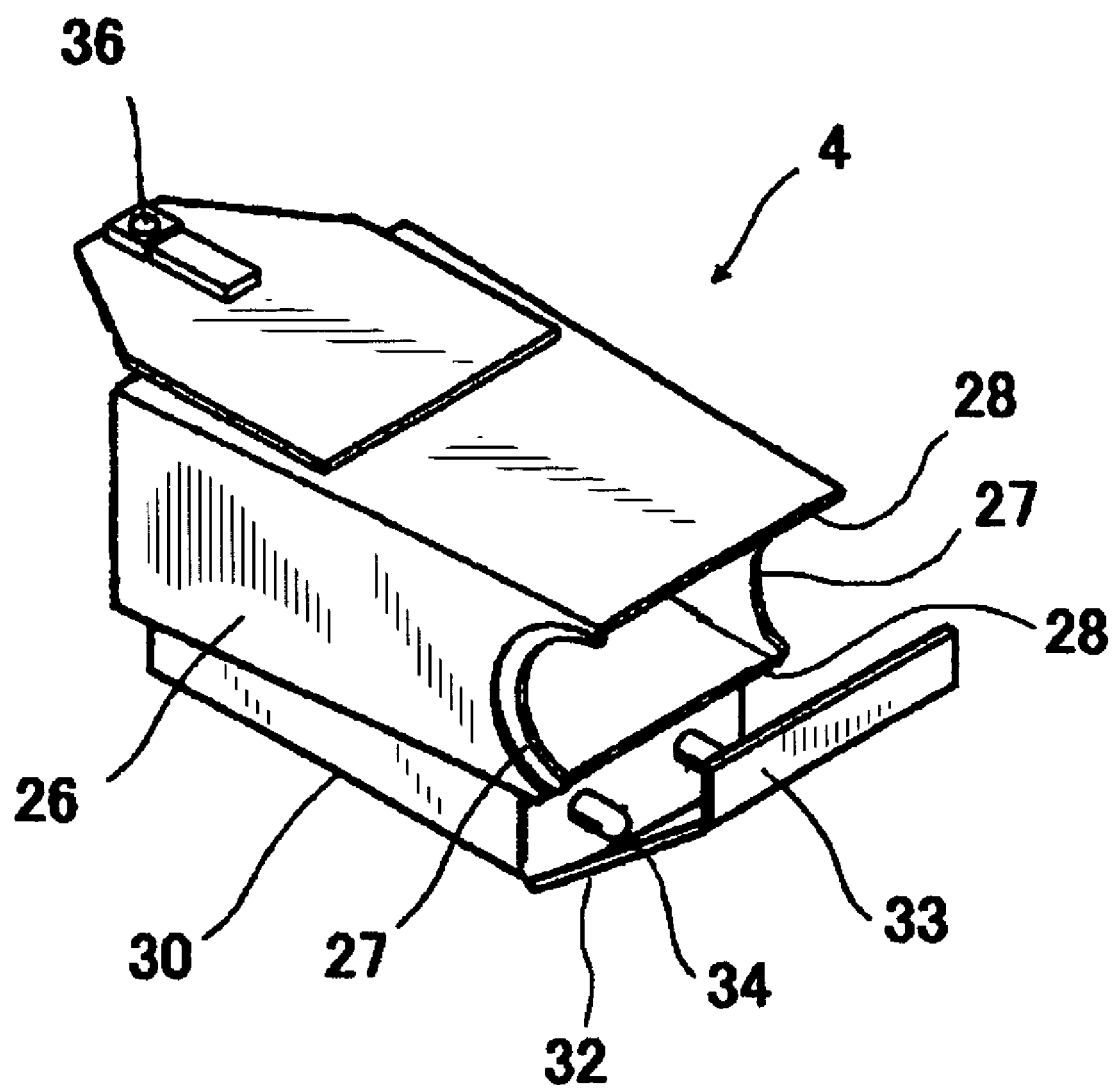
FIG. 11 is a perspective view of a support body for the image material assembly.

Referring to FIGS. 3 and 11, the support body 4 is attached in the end portion 7 of the kaleidoscope body 2, and two concave parts 27 are provided to mount the image material assembly 3, the concave parts 27 have concave portions, formed in the shape of a semicircle, which engage the two guide slots 19, 19 which are formed at the outer circumferential portion of the image material assembly 3 and support rotatably and detachably the ends of the container of the image material assembly 3 along the guide slots 19, 19.

A support member 33 prevents the image material assembly 3 from escaping the opening end of the concave parts 27 and is formed in a right angle state to an axial direction of the kaleidoscope body 2.

Referring to FIGS. 7 and 11, a support pipe 26 is formed having projections 28, 28 that touch the cylinder surface of the image material assembly 3. Reflective parts 29, 29 are positioned between the projections 28, 28 and the end portion of the kaleidoscope body 2.

In order to insert the image material assembly 3 in the support body 4, the support member 33 is elasticity formed in the end portion of a reflective plate 32 and is opened by insertion of the image material assembly 3 to receive the image software 3. Then the guide slots 19, 19 are engaged with the concave parts 27 respectively. Thereby, the image material assembly 3 can be rotated at a fixed position on the concave part 27, and it does not release from an open end. Thereby, since the image material assembly 3 can be detached and attached by one-touch, it is easy to exchange of the image material assembly which was trouble conventionally so that the user can exchange the image material assembly 3 and can enjoy easily.

Moreover, since there are no functional parts like a rotation axle in the appearance, the form of the image material assembly 3 for the kaleidoscope can be made into a graceful design worthy of appreciation even if independent.

The edge of the mirrors 9, 9 and 10 of the kaleidoscope body 2 is usually constituted by a straight line edge. A space is created between a plane and a curved surface when the end portion 7 of the kaleidoscope body 2 is touched to the cylindrical surface of the image material assembly 3. When the kaleidoscope 1 is looked into in case that there is the space, the unrelated exterior scenery is reflected in the circumference part of the image from the space, and becomes image noise like the imbricate pattern of a carp streamer, and the beauty of the picture is spoiled.

In order to prevent such condition, the projections 28, 28 that are provided at the edge of the support pipe 26 are jutted out like eaves so as to touch to the cylindrical surface of the image material assembly 3. The space between the end portion 7 of the kaleidoscope body 2 and the cylindrical surface of the image material assembly 3 is thus closed, preventing unrelated exterior scenery from being reflected.

Moreover, the reflective parts 29 are formed between the projections 28 inside the support pipe 26 and the end portion 7 of the kaleidoscope body 2. Thereby, the image software medium 24 of the image material assembly 3 is reflected by the reflective parts 29, and a beautiful image can be secured. Moreover, since the reflective parts 29 are attached so as to touch the cylinder surface of the image material assembly 3, the distance of the cylinder surface and the reflective part 29 becomes so small that a contacting point is approached. Since the image of the cylinder surface is clearly projected to the reflective part 29 so that the distance of the cylinder surface and the reflective part 29 becomes small, it is reflected with gradation, and the joint with a contacting point is not apparent so that the natural beautiful image is produced without noise around the image.

In addition, the reflective part 29 makes the color and is formed to give a fixed effect to catoptrical light, such as for example a white and mirror-made surface so that it can give change to the image when the user peeps into the kaleidoscope 1.

Referring to FIGS. 4–7, 14, 17, 19, and 23, the lighting device 5 is comprised of a case 30; a power supply 31; the reflective plate 32; white Light Emitting Diodes (LED) 34, 34 with high luminosity; and a control circuit 37.

The case 30 is attached at the bottom surface of the support body 4. The power supply 31 has a battery installed into the case. The reflective plate 32 projects upwards via the slope at about 45 degrees from the lower part of the case 30 for the power supply, expanding an upper surface thereof, and forming a reflective surface at a part faced to the end portion 7 of the kaleidoscope body 2. At least one or more lighting lamps, two white LED 34, 34 with little generation of heat and power consumption, project into the reflective plate 32, and irradiate in parallel to the axial direction of the kaleidoscope body 2. The control circuit 37 is interposed between the lighting lamps 34 and the power supply 31, and capable of turning on the lighting lamps 34 by turning on the switch 36 installed in a support plate 35 attached to the upper surface of the support body 4. Thereby, the reflective plate 32 bends the light of the lighting lamps 34, and the image material assembly 3 for the kaleidoscope is illuminated from a direction right-angled mostly to the axial direction of the kaleidoscope body 2.

In the lighting device 5, the undersurface of the image material assembly 3 is illuminated because the image material assembly 3 is seen not by penetration light but by catoptrical light.

Since it is seen by the catoptrical light of the light from a side portion to a sight, shade arises on an image and there is a three-dimensional effect.

Figure 9:
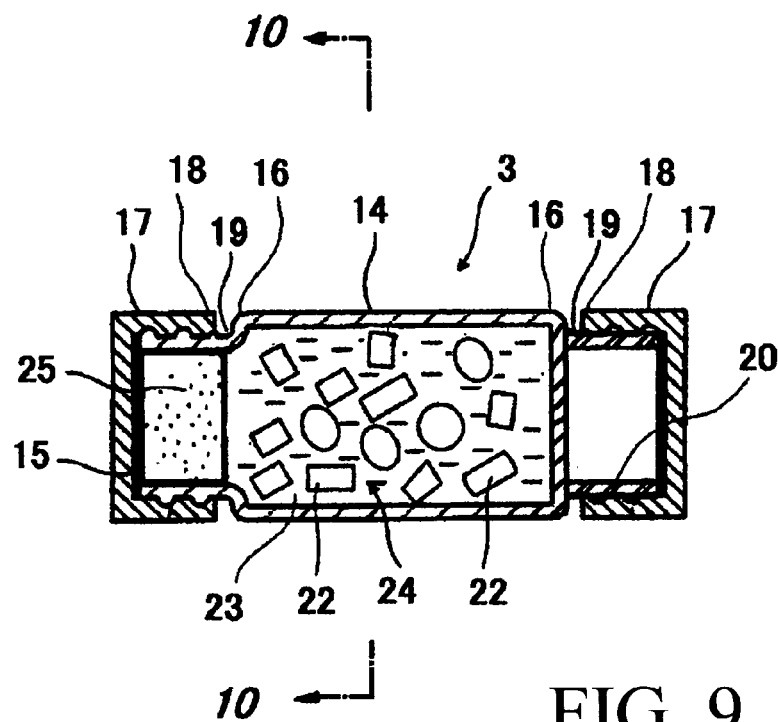
FIG. 9 is a cross sectional view of an image material assembly for the kaleidoscope.
Figure 10:
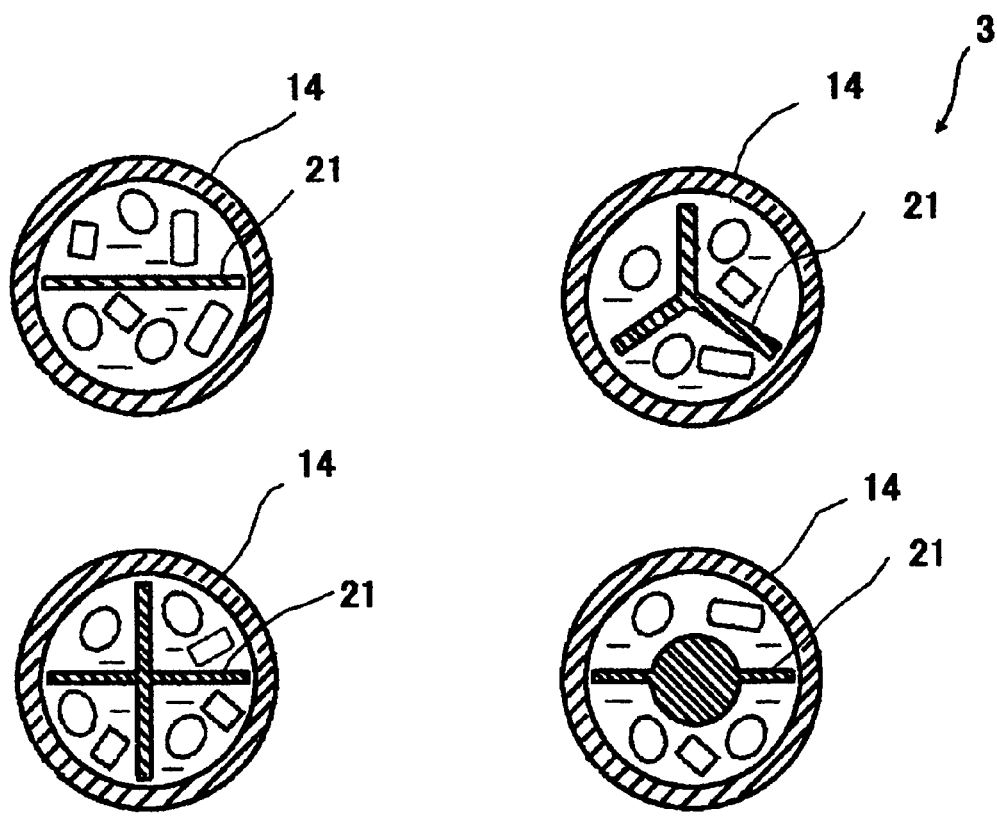
FIG. 10 is a cross sectional view taken along a line 10—10 of FIG. 9.

Moreover, the opaque object 22 of FIG. 9 can be used, and the selection range of material increases, and the range of creation spreads.

Moreover, the light is illuminated to the surroundings to the whole container body 14, and the whole contents in the container body 14 is watched transparently and beautifully even if the liquid 23 is colored and is watched with penetration light. In addition, there are a few influences which the surface catoptrical light of the container body 14 has on the image so that a clear image is shown.

In this embodiment, the indirect illumination is used via the reflective plate 32, and it does not illuminate the undersurface of the image material assembly 3 directly with the lighting lamp 34 of the lighting device 5 because a luminous-intensity distribution on the lighting lamp 34 produces bright spot patches.

The patches in a luminous-intensity distribution of the lighting lamp 34 become so clear that a light source is approached, and there is a factor that checks the beauty of an image. In order to avoid the patches, it is effective to separate the light source from the subject and to scatter a beam.

The compact composition can also enlarge a distance between the light source and subject by using the reflective plate 32. Also the beam can be scattered, and a uniform soft light can illuminate throughout the irradiation side of the image material assembly 3.

Moreover, when the reflective part of the reflective plate 32 is formed a curved surface, it can work as a concave mirror, and the light of the lighting lamp 34 can be efficiently collected to the image material assembly 3, and the brightness of an image can be increased.

Moreover, the atmosphere of an image can be changed by making the surface of a reflective part a color white, a mirror surface and the like.

Although the upper surface of the reflective plate 32 of the lighting device 5 is opened for detaching easily the image material assembly 3, when the surrounding situation is bright, natural light can be taken in. The battery is saved, and it is economical using the lighting device 5 only when it is dark.

At this time, the reflective part of the reflective plate 32 works as a condensing mirror, and the taken-in light is efficiently brought together in the image material assembly 3, and it is effective in increasing the brightness of the image.

In addition, the reflective plate 32 prevents fall out of the image material assembly 3 when the image material assembly 3 is installed and absorbs shock when the kaleidoscope body drops. Therefore, the image material assembly 3 and the lighting lamp 34 are protected from breakage.

The switch 36 of the lighting device 5 is located in the position that can be pushed by the index finger or the middle finger when the user takes the kaleidoscope 1 using a single hand and the center of gravity is supported with the thumb finger. Thus, the switch 36 can be operated single hand.

In this embodiment, a white LED is used as the lighting lamp 34 of the lighting device. It means that it is small and illuminates a strong white light, and there is a great effect to the reappearance of color. In addition, it works on a battery, and since there is little generation of heat and power consumption and the battery withstands long use, the lighting device 5 can be miniaturized and it is convenient for carrying.

Although the lighting device 5 with the white LED as the lighting lamp 34 is explained, various kinds of lighting lamps may be used, such as for example, the usual filament lamp, a high halogen lamp with color temperature and the like.

Moreover, although it is explained that the image material assembly 2 is illuminated from a right angle to the axle direction of the kaleidoscope body 5, the image material assembly can be illuminated from any direction.

Figure 26:
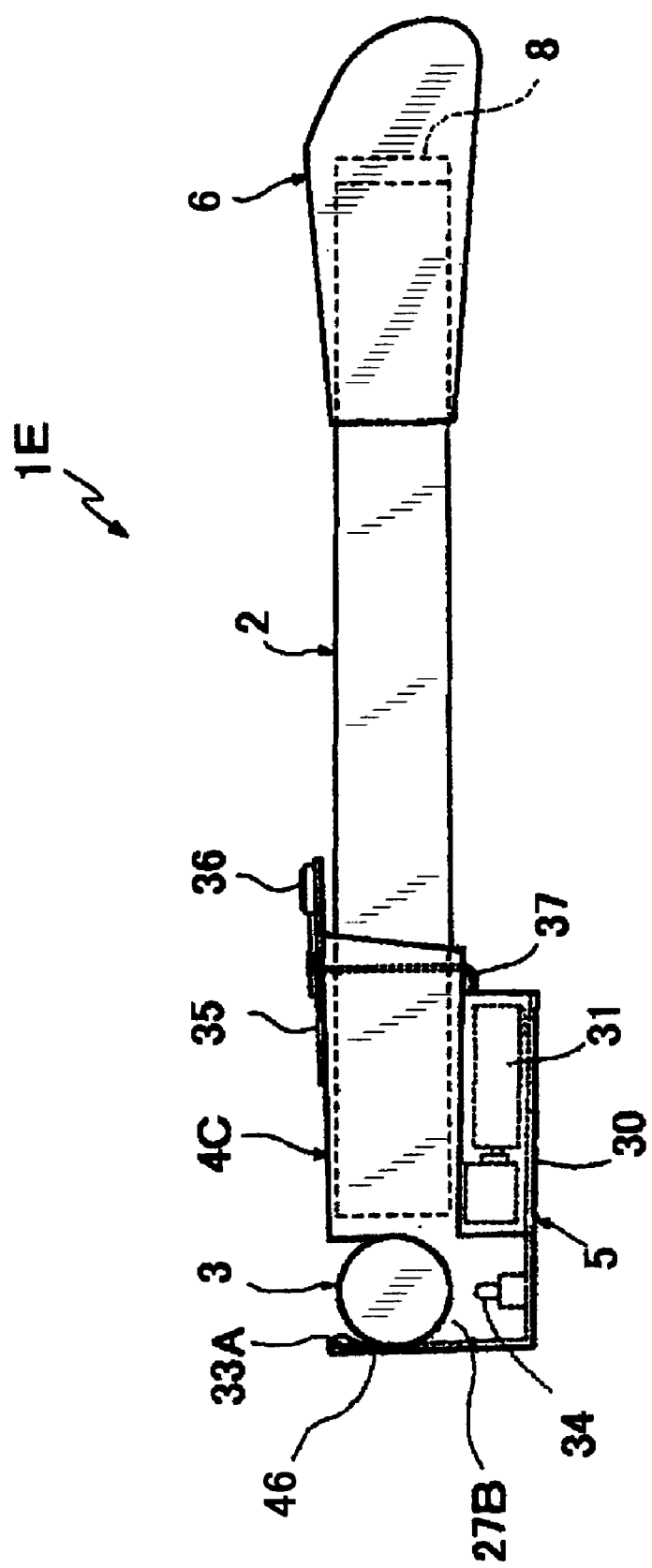
FIG. 26 is a side view.
Figure 27:
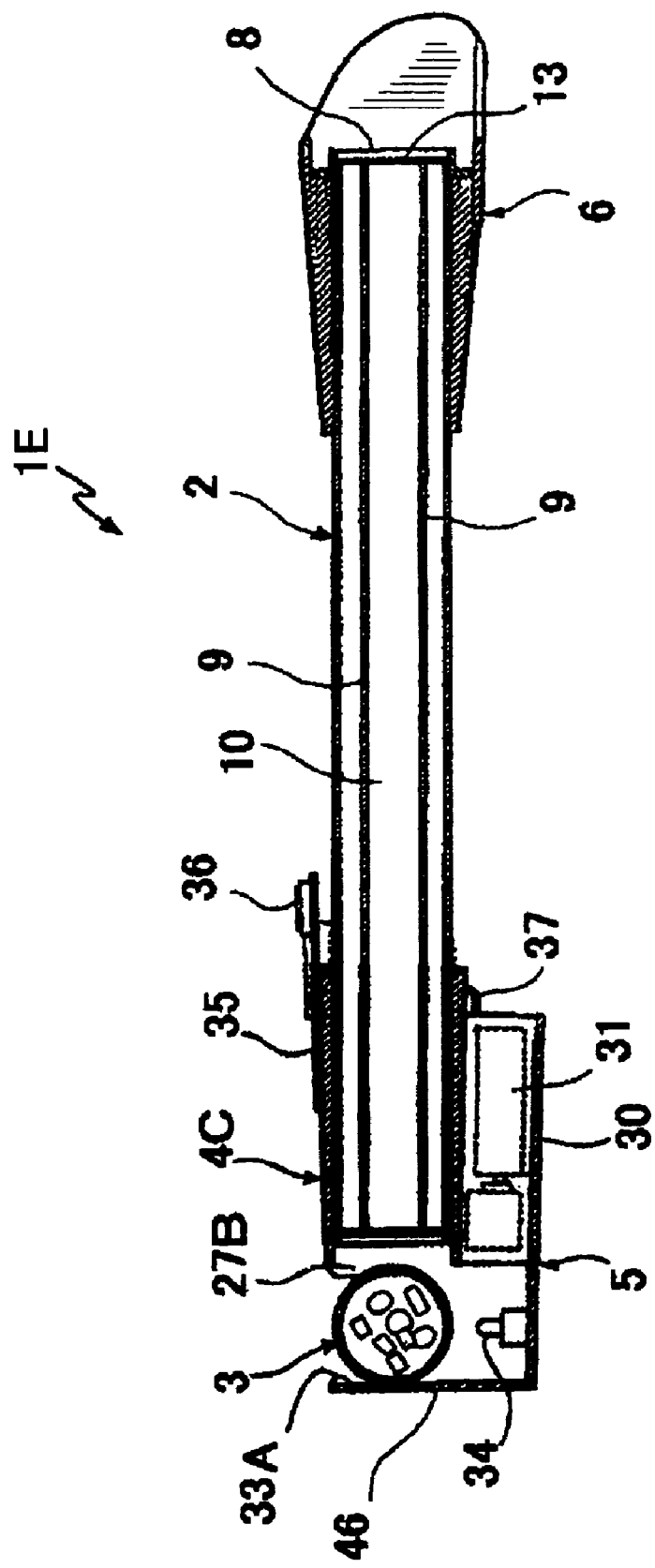
FIG. 27 is a cross sectional view taken along a line 27—27 of FIG. 25.

In addition, as illustrated in FIGS. 26 and 27, the light of the lighting lamp 34 may apply directly without using the reflective plate 32.

Figure 12:
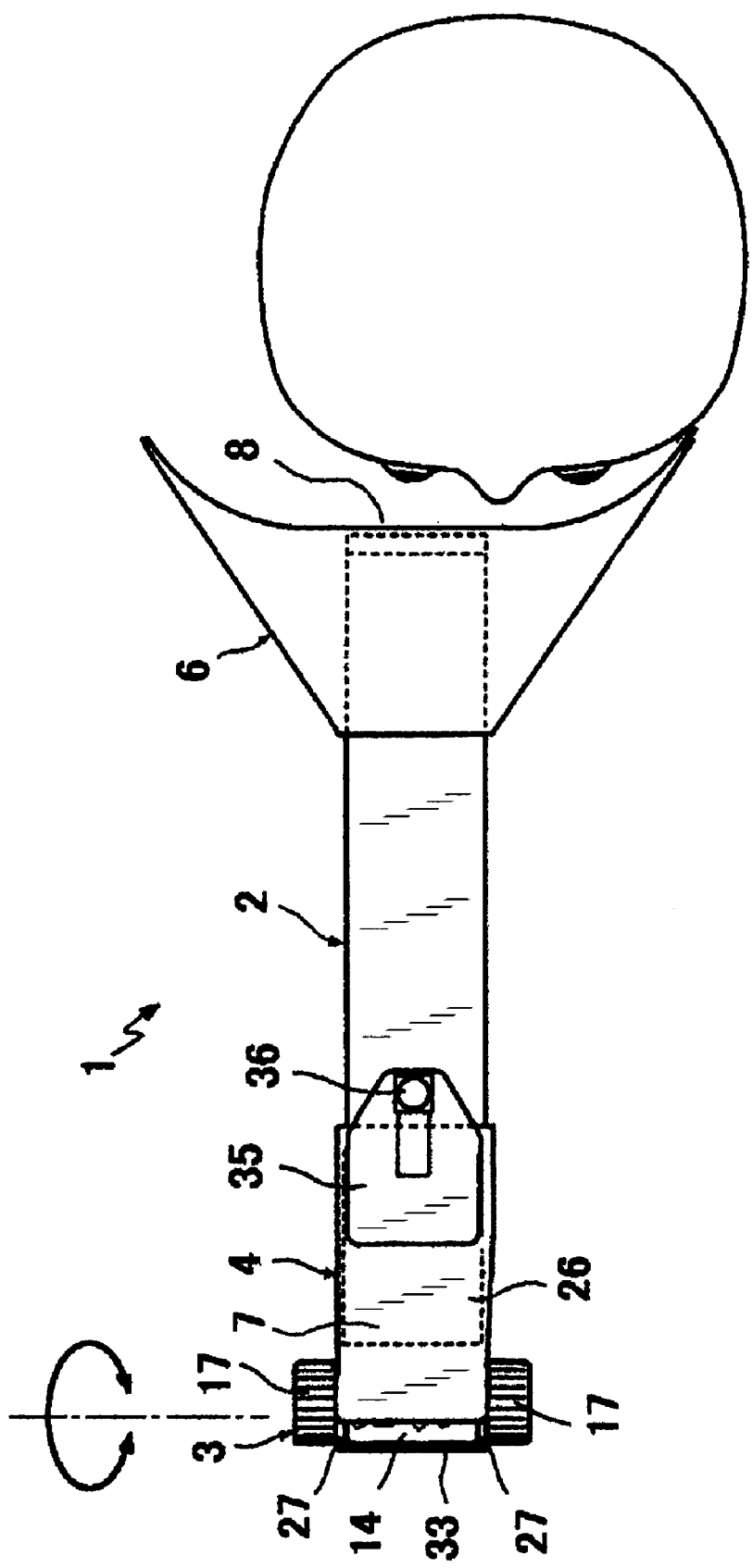
FIG. 12 is a top view of the invention of the first embodiment when in use.

Referring to FIG. 3, eye cover 6 includes a hood 38 attached to the window 8 of the kaleidoscope body 2, capable of covering both eyes when the user is looking into the window 8 by one of eyes, expanding to the right and left directions as shown in FIG. 12.

Although the clearer image could be obtained when the eye cover is attached in the window of the kaleidoscope, in general, the usual kaleidoscope has an eye cover for a single eye. In the usual kaleidoscope with the eye cover for a single eye, one eye needs to shut, and it has the fault that an eye got tired.

In this invention, even though the window 8 of the kaleidoscope body 2 is looked by the right or left eye, one of the eyes is covered so that it can be peeped into by either of the eyes. Therefore, since it does not matter whether the right eye is used, both eyes can be open and it can be looked into, and three-dimensional effect is felt for the image and the eyes does not get tired.

Moreover, there is no movable part in the eye cover 6 so that it is simple and is hard to break and durable.

In the kaleidoscope 1, after the support member 33 is is deflected, the image material assembly 3 for the kaleidoscope is inserted into the support body 4. After that, the user peeps through the eye cover 6, turning on the switch 35 and the lighting lamps 34 of the white LED.

When the cap 17 of the image material assembly 3 for the kaleidoscope is rotated by pinching, the kaleidoscope is illuminated with the lighting lamps 34, 34 in the dark room, and the bright and beautiful image also can be enjoyed with an easy posture.

Other embodiments of the present invention will now be described with reference to FIGS. 13–39. In FIGS. 13–39, the same components as in the first embodiment described above with reference to FIGS. 13–39 are designated by the same reference numerals and therefore will not be further explained in great detail.

Figure 13:
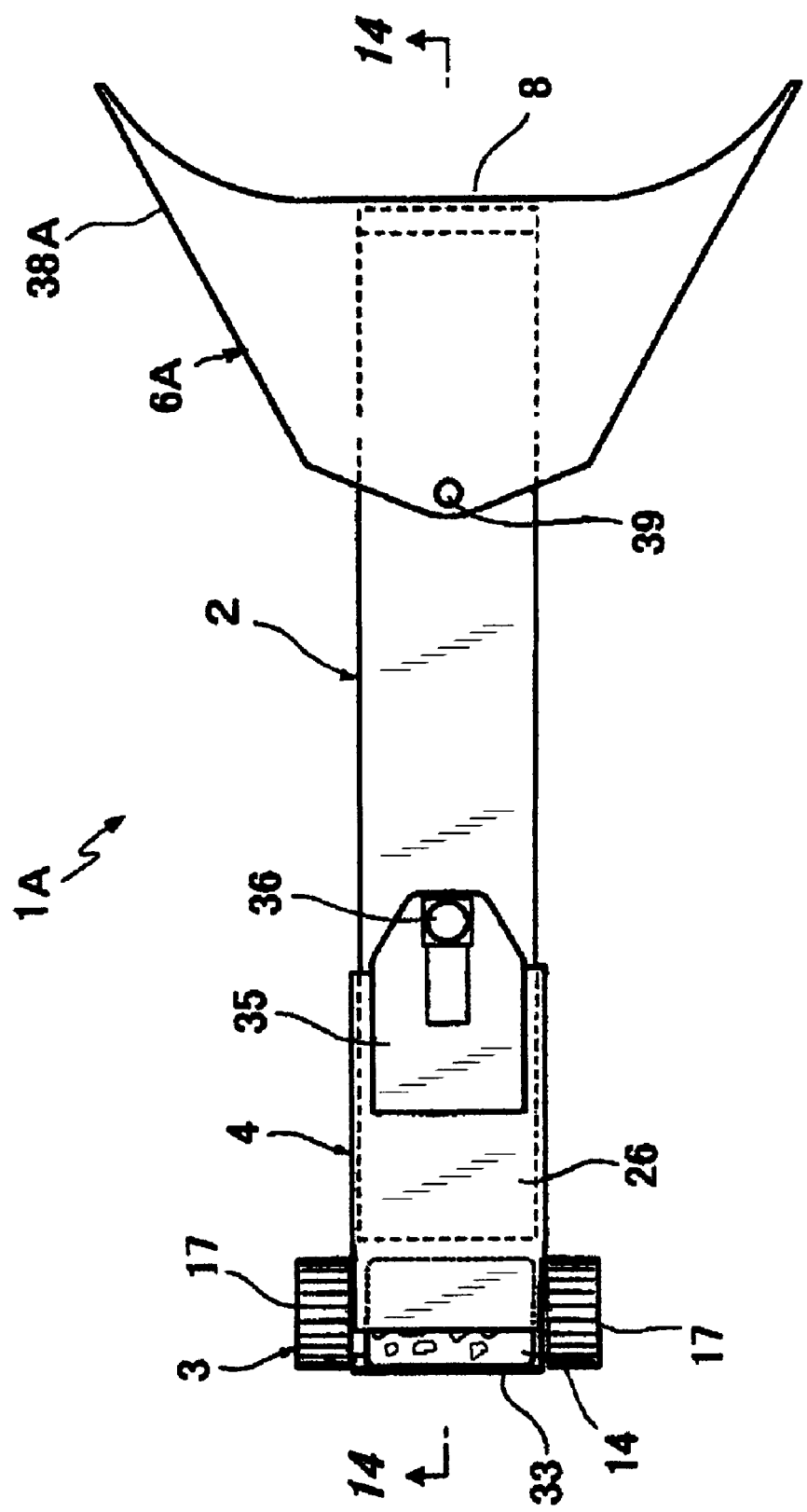
FIG. 13 is a top view showing a second embodiment.
Figure 14:
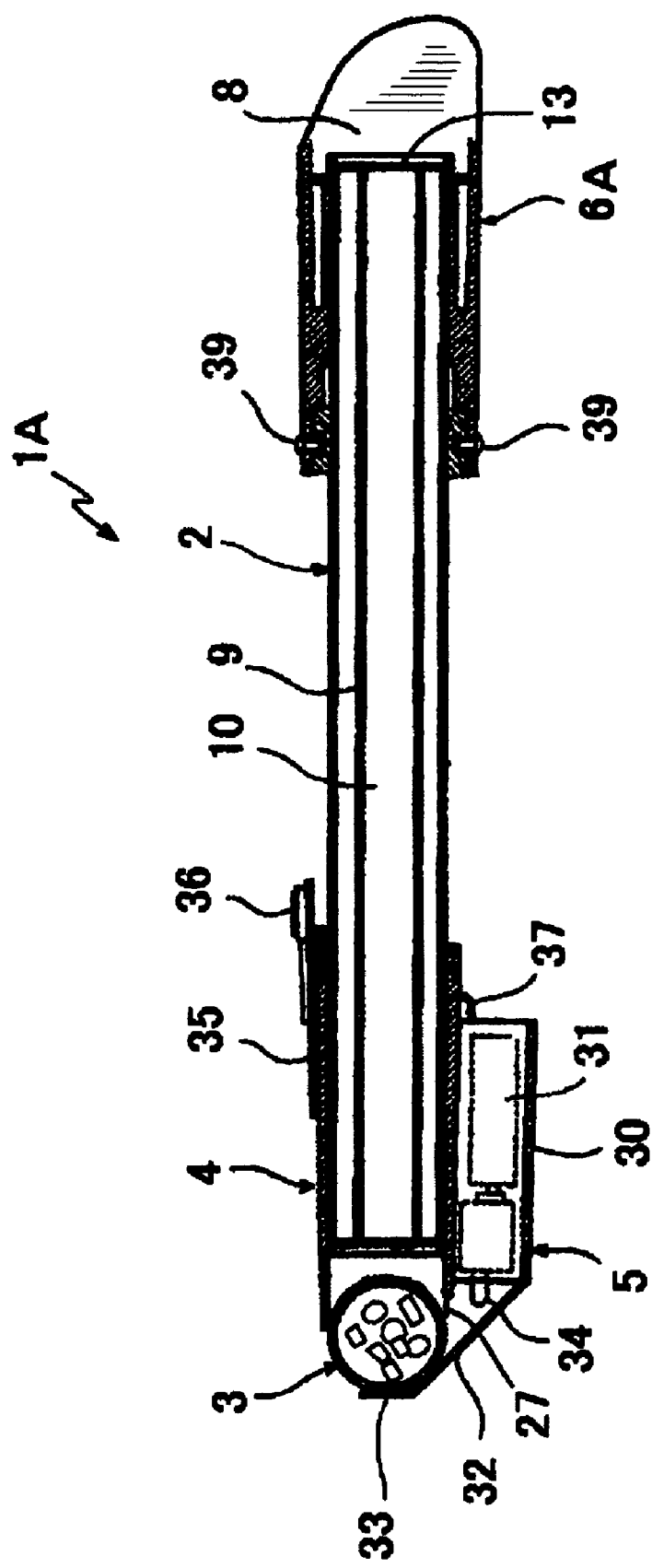
FIG. 14 is a cross sectional view taken along a line 14 14 of FIG. 13.
Figure 15:
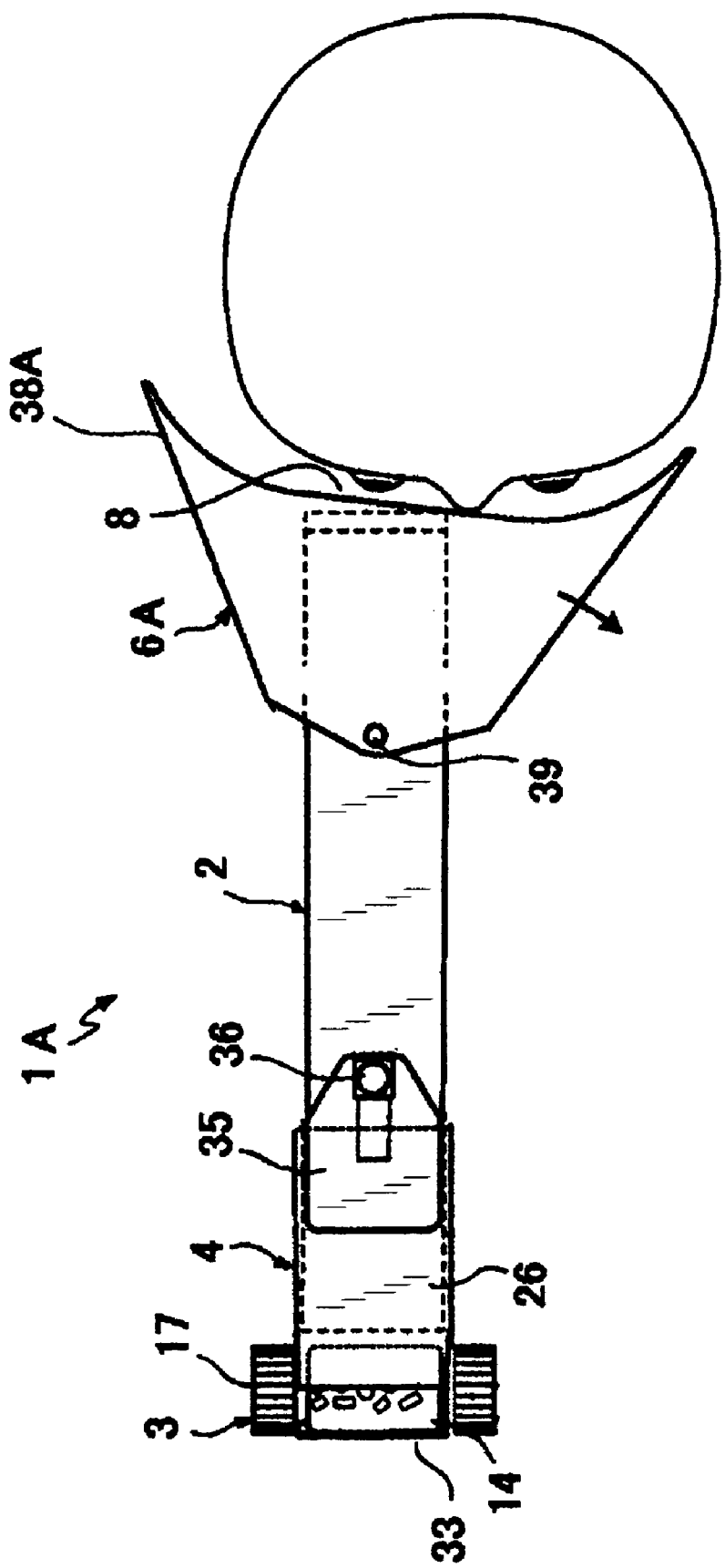
FIG. 15 is a top view of the invention of the second embodiment when in use.

A second embodiment of the present invention is shown in FIGS. 13–15. It is distinguished from the first embodiment in that a hood 38A that covers both eyes is attached movably at the window 8 of the kaleidoscope body by pivot pins 39, 39 and pivots to the right-and-left directions. Therefore, one of the eyes can be covered by moving the hood 38A when it is peeped with either eye.

A kaleidoscope 1A according to the second embodiment has similar advantages to that according to the first embodiment.

Figure 16:
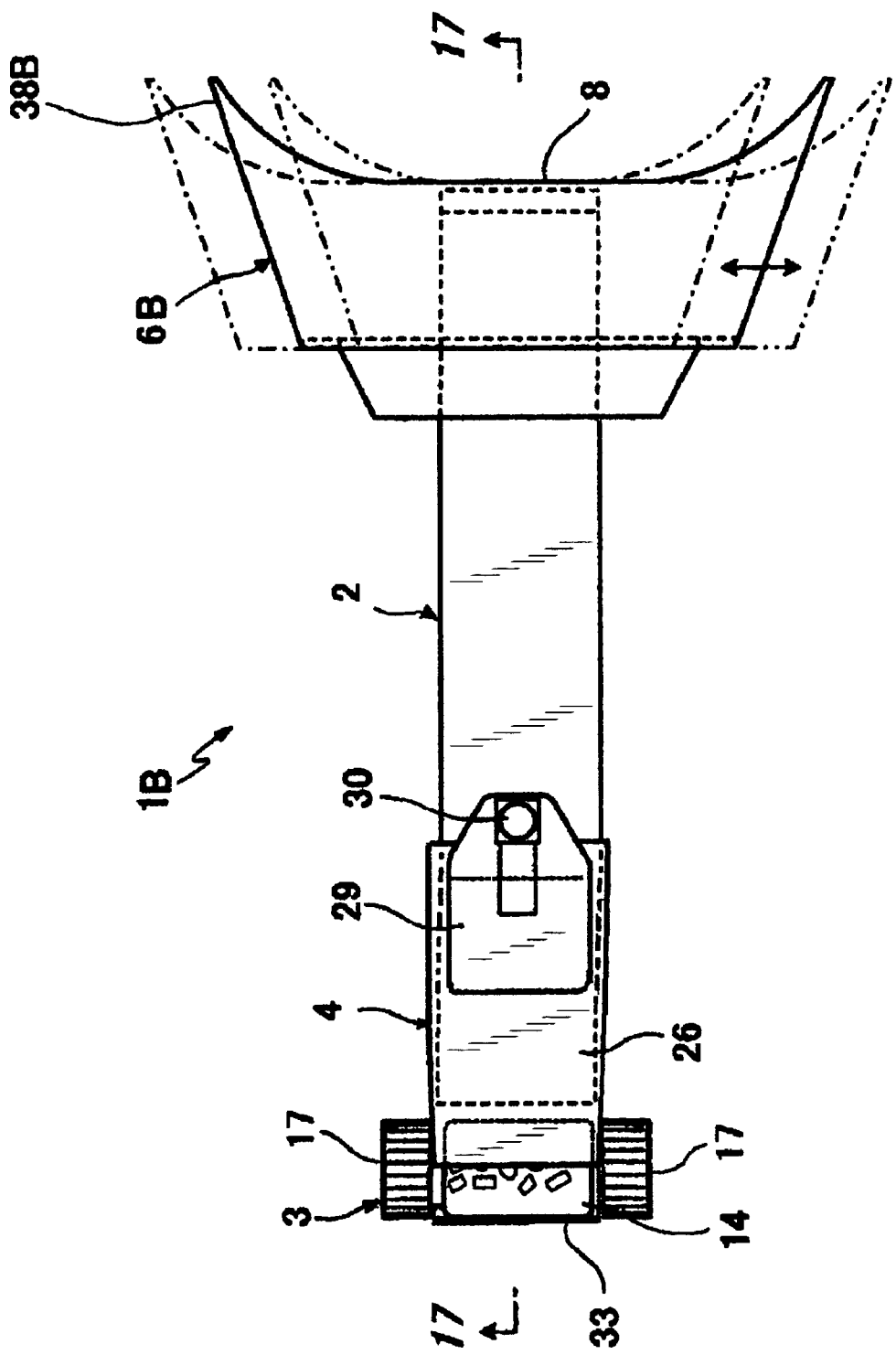
FIG. 16 is a top view showing a third embodiment.
Figure 17:
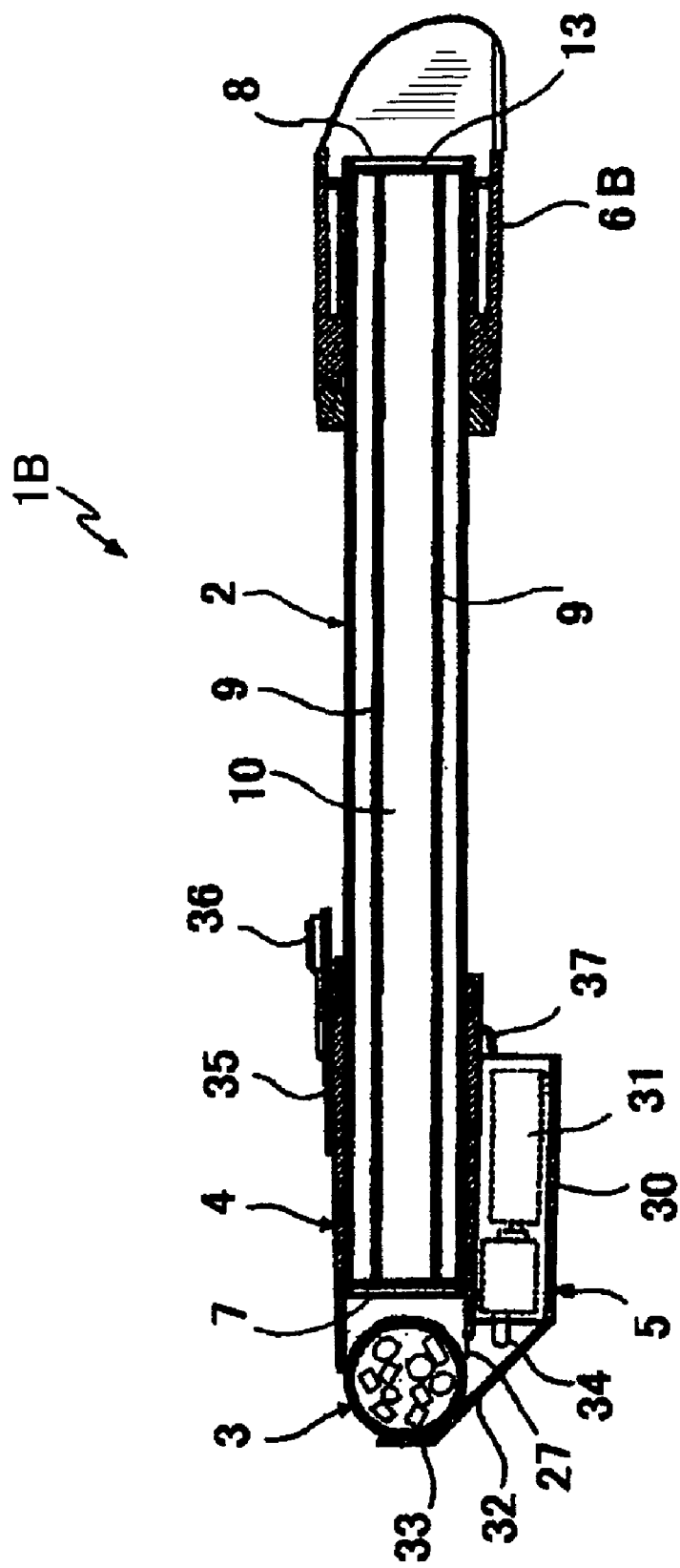
FIG. 17 is a cross sectional view taken along a line 17—17 of FIG. 16.
Figure 18:
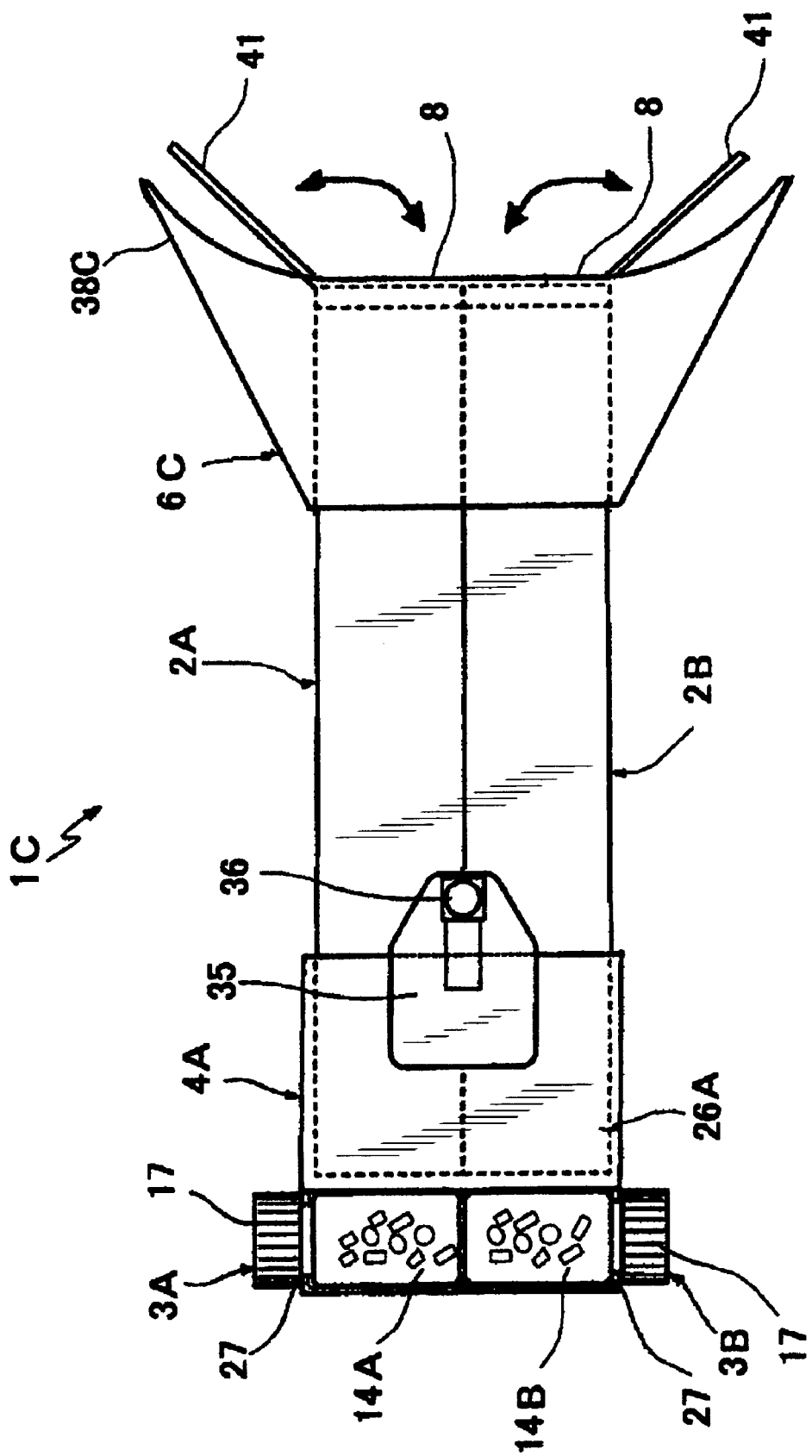
FIG. 18 is a top view showing a fourth embodiment.
Figure 19:
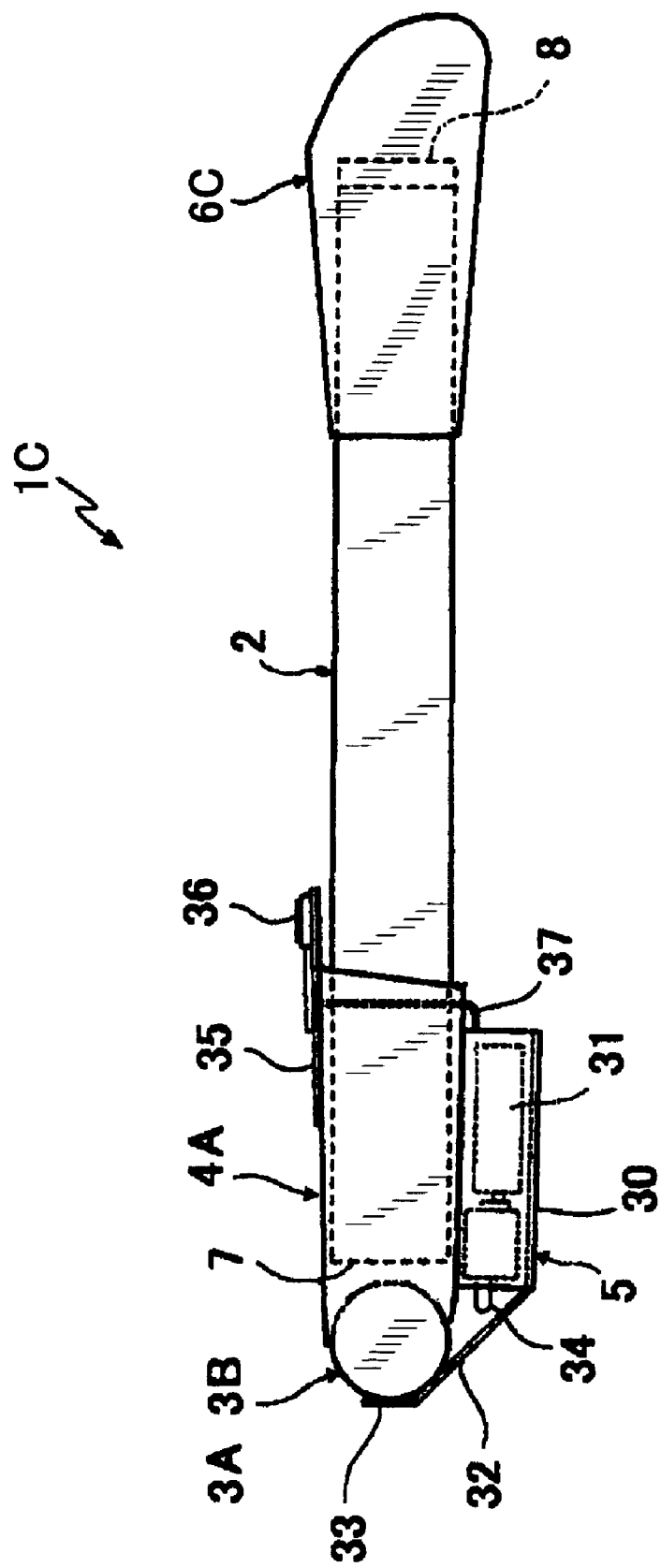
FIG. 19 is a side view.
Figure 20:
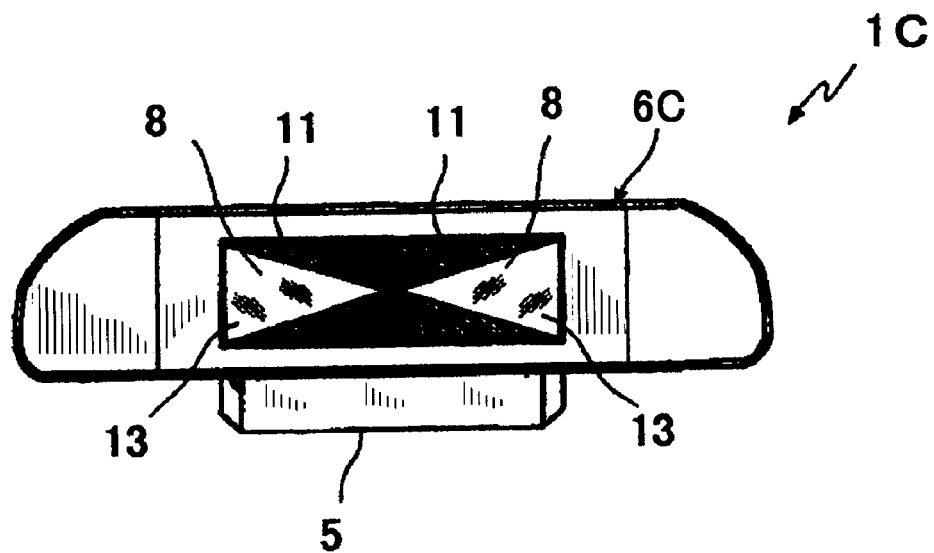
FIG. 20 is a back view.
Figure 21:
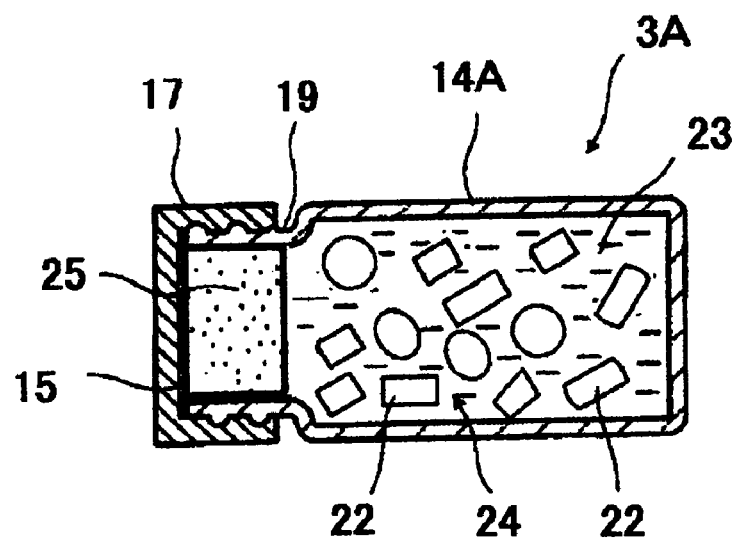
FIG. 21 is a cross sectional view of an image material assembly for the kaleidoscope.

A third embodiment of the present invention is shown in FIGS. 16 and 17. It is distinguished from the first embodiment in that a hood 38B that covers both eyes is attached slidably at the window 8 of the kaleidoscope body by slide rails 40, 40 permitting sliding to the right-and-left direction. Therefore, one of the eyes can be covered by sliding the hood 38B when another looks to the window of the kaleidoscope body.

A kaleidoscope 1B according to the second embodiment has similar advantages to that according to the first embodiment.

A fourth embodiment of the present invention is shown in FIGS. 18–21. It is distinguished from the first embodiment in that a kaleidoscope is comprised of two kaleidoscope bodies 2A, 2B, a support body 4A and two image material assemblies 3A, 3B. The kaleidoscope bodies 2A, 2B are arranged in parallel so that it can be viewed by both eyes. The support body 4A is attached in the end portion 7 of the kaleidoscope bodies 2A, 2B, supporting independently the two image material assemblies 3A, 3B corresponding to the kaleidoscope bodies 2A, 2B. The image material assemblies 3A, 3B includes the container supported by the support body 4A, the container having the image material assembly members 24A, 24B thereinto. A kaleidoscope 1C according to the fourth embodiment has similar advantages to that according to the first embodiment, and the user can see the different image of the image material assembly by both of eyes.

Although the kaleidoscope which can be peeped into by both eyes exists and the user can enjoy the complicated image which overlaps, the image material assembly is shared, and the image reflected in both eyes is the same condition. Therefore, it overlaps depending on image material assembly and a visible image may be felt an obstacle.

There is a physiology phenomenon of recognizing more vividly what is moving from what has stopped in an eye. The image material assembly 3A, 3B are supported so as to move to correspond to each of the kaleidoscope bodies 2A, 2B respectively, and they can move independently. Therefore, when the user looks into the eye cover by both eyes, the moved image which is turned is recognized more vividly, and the image which is not moved is hard to recognized after one of the image material assembly 3A or 3B is turned. Therefore, the user can enjoy the image that is more complicated as a whole, deep, clear and has three-dimensional effect.

However, it is case that the image overlaps and may be felt to be an obstacle. Moreover, there is also demand of wanting to concentrate more and to enjoy one of the images. Then, a cover 41 is provided in each of the window 8 of the kaleidoscope bodies 2A, 2B, and it opens and closes if needed, and the user can chose the image and he can enjoy.

Figure 22:
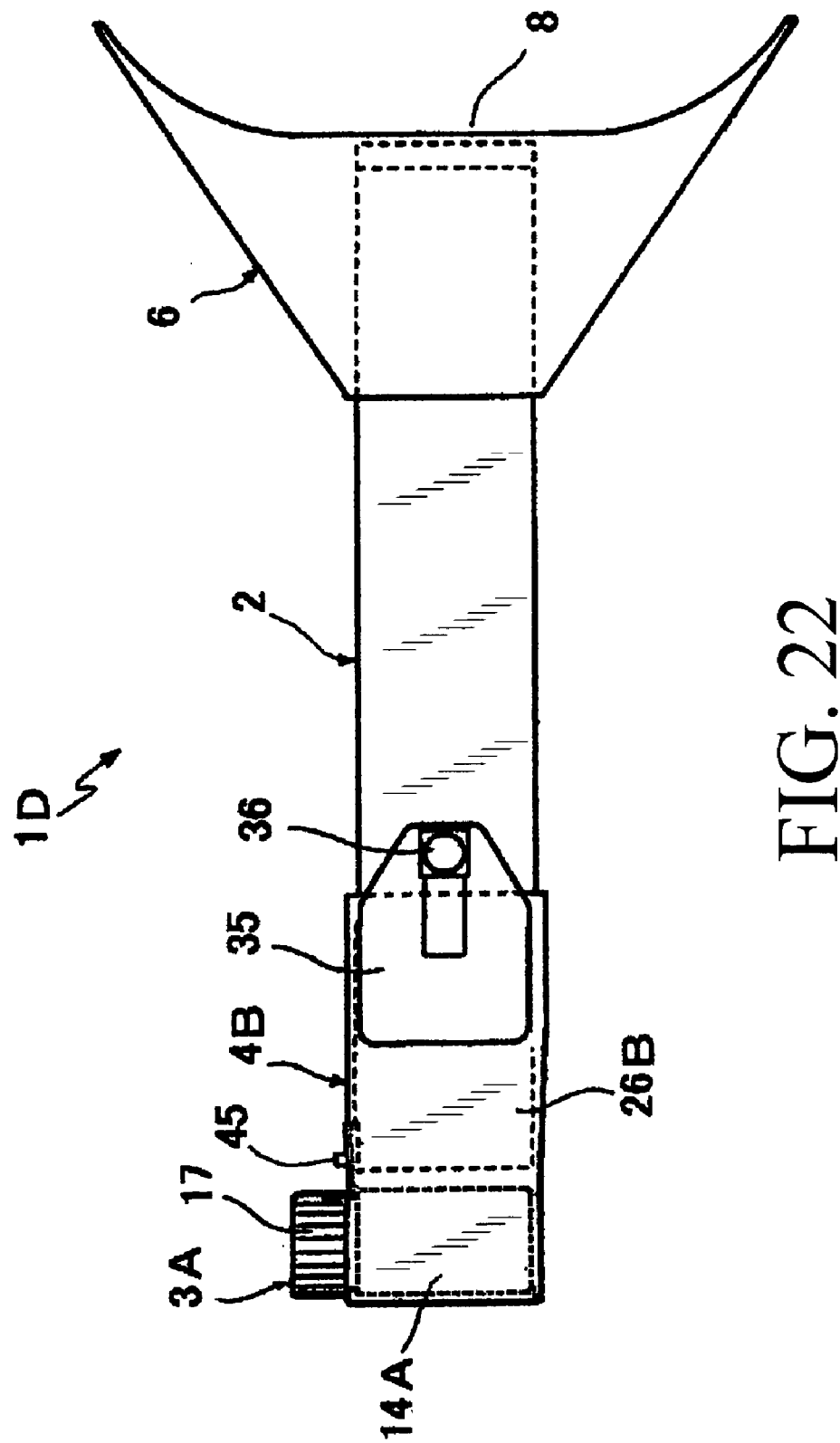
FIG. 22 is a top view showing a fifth embodiment.
Figure 23:
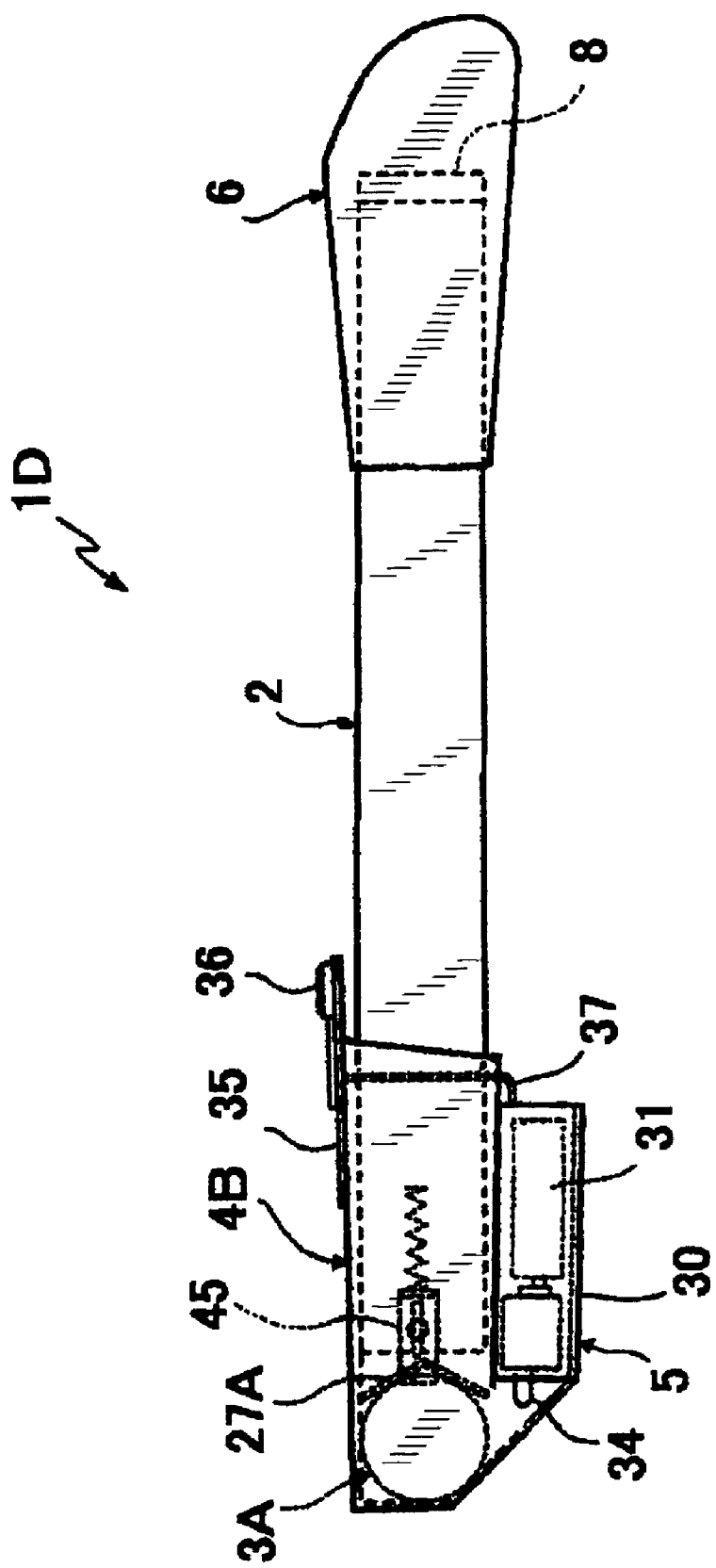
FIG. 23 is a side view.
Figure 24:
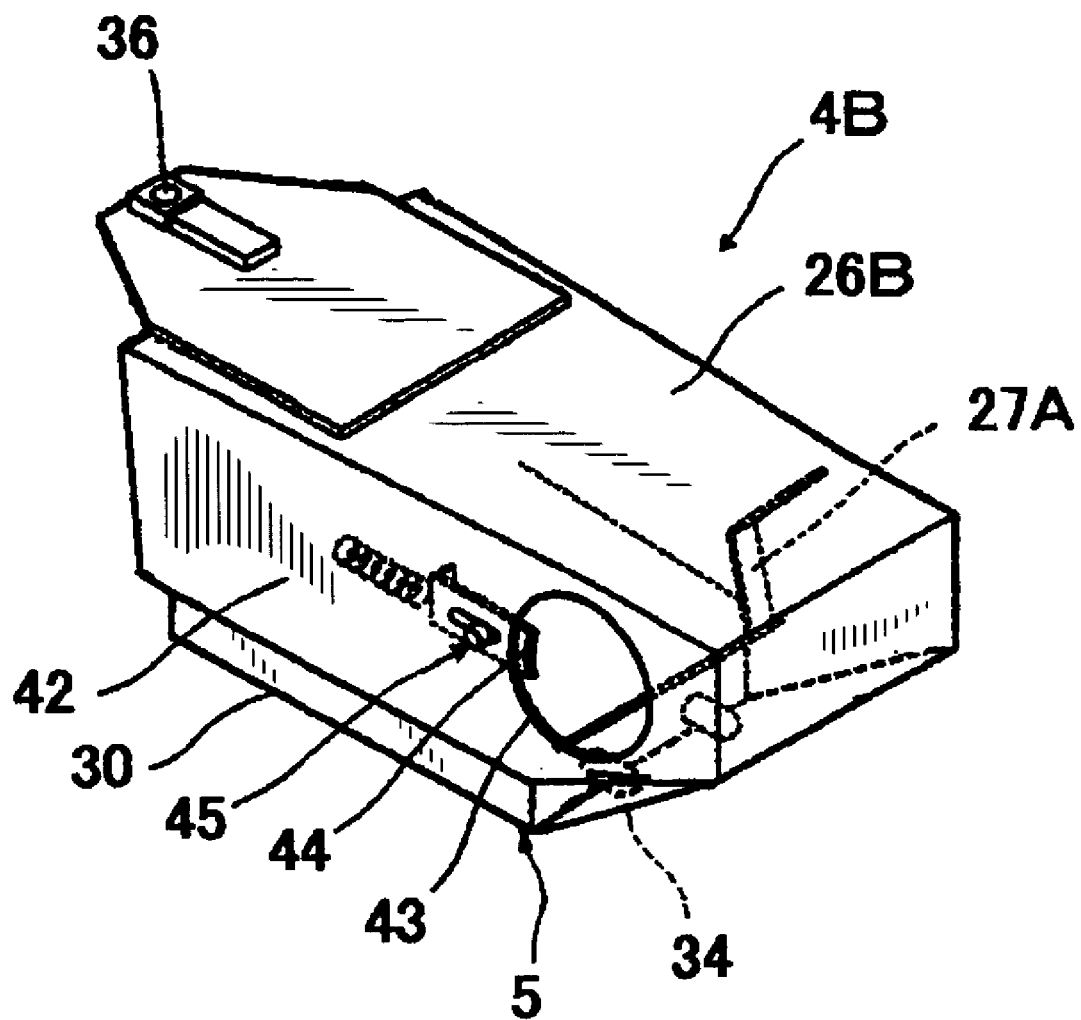
FIG. 24 is a perspective view of a support body for the image material assembly.

A fifth embodiment of the present invention is shown in FIGS. 22–24. It is distinguished from the first embodiment in that the support body 4 is replaced with another support body 4B. The support body 4B includes a support pipe 26B and a lock system 45. The support pipe 26B covers a whole outer surface part of the kaleidoscope body 2 having a slope at 45 degrees at a bottom portion thereof, and a hole 43 into which is inserted an image material assembly 3A from the one of side walls 42. The lock system 45 is attached slidably at the side wall 42, having a lock projection 44 which engages the guide slot 19 of the image material assembly 3. A kaleidoscope ID with the support body 4B according to the fifth embodiment has similar advantages to that according to the first embodiment.

Figure 25:
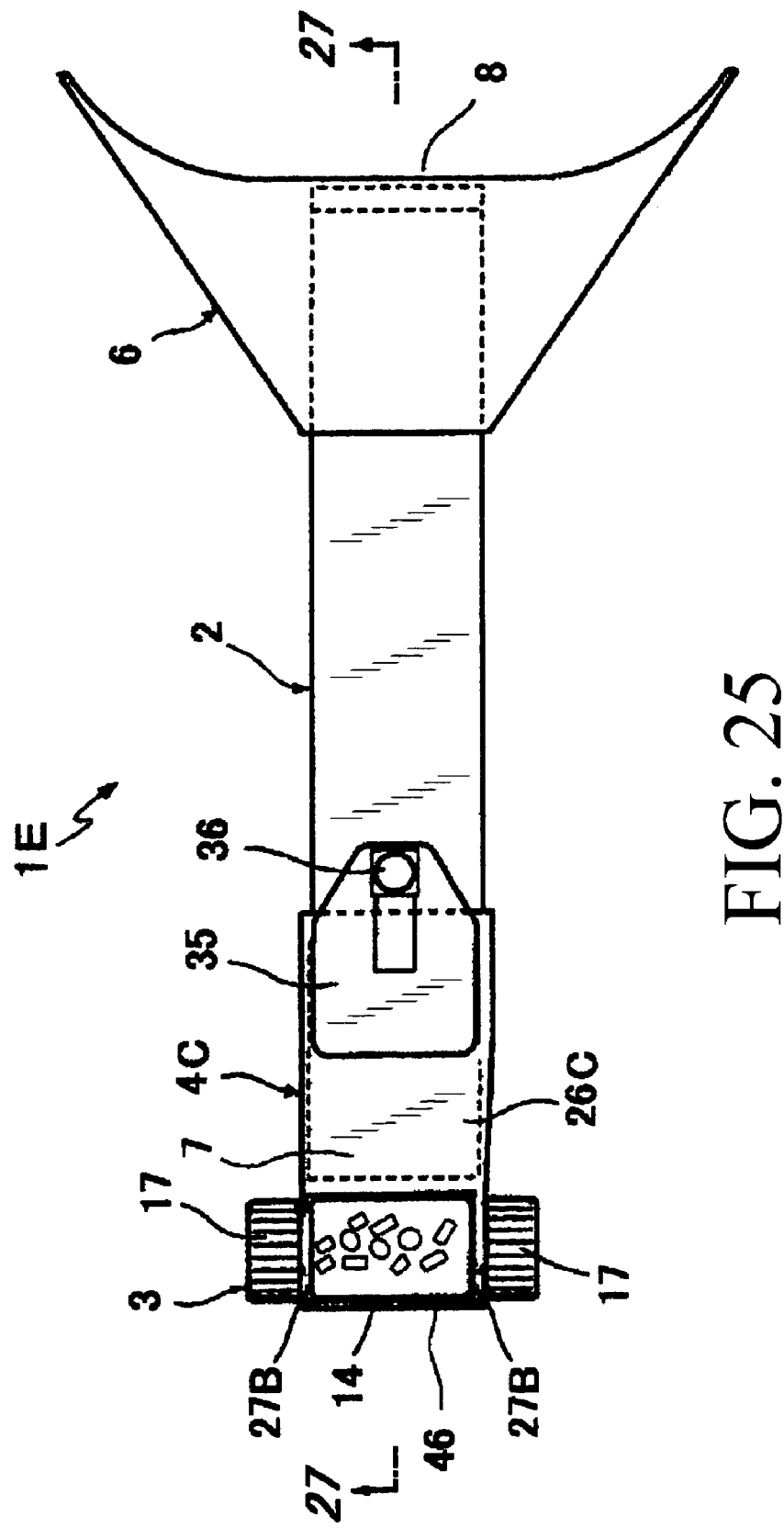
FIG. 25 is a top view.

A sixth embodiment of the present invention is shown in FIGS. 25–27. It is distinguished from the first embodiment in that the support body 4 is replaced with another support body 4C having a support part 46 into the image material assembly 3 is inserted from the upper part thereof. A kaleidoscope 1E with the support body 4C according to the second embodiment has similar advantages to that according to the first embodiment.

Figure 28:
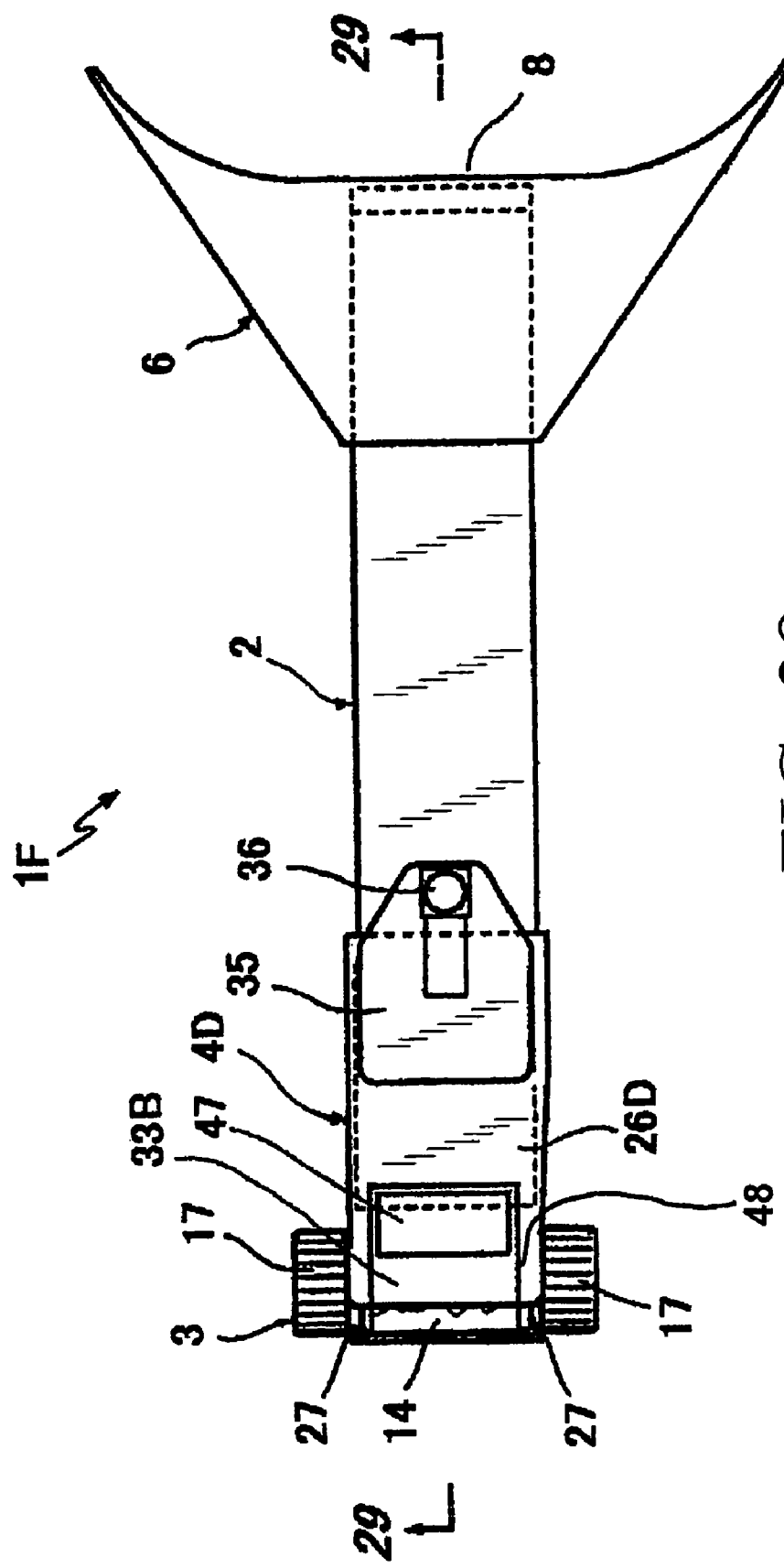
FIG. 28 is a top view.
Figure 29:
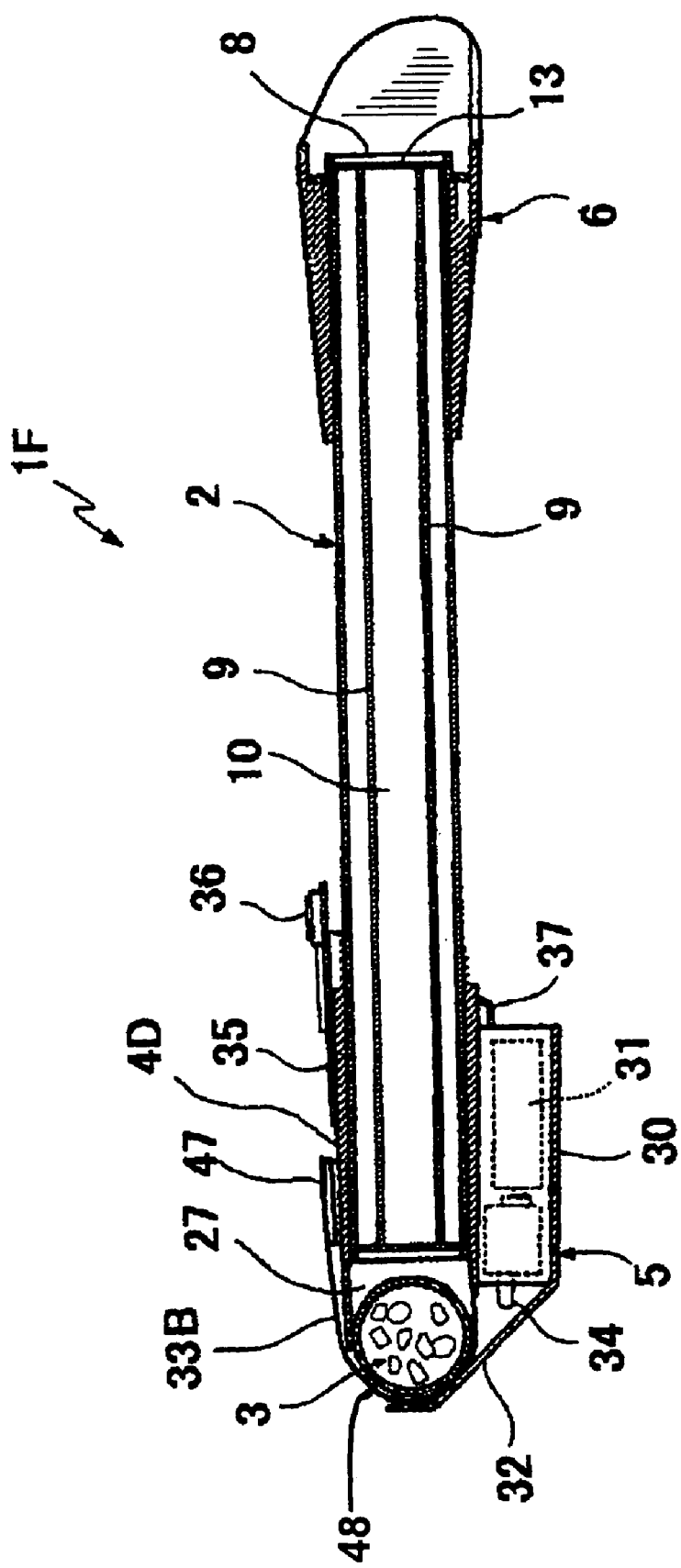
FIG. 29 is a cross sectional view taken along a line 29—29 of FIG. 28.
Figure 30:
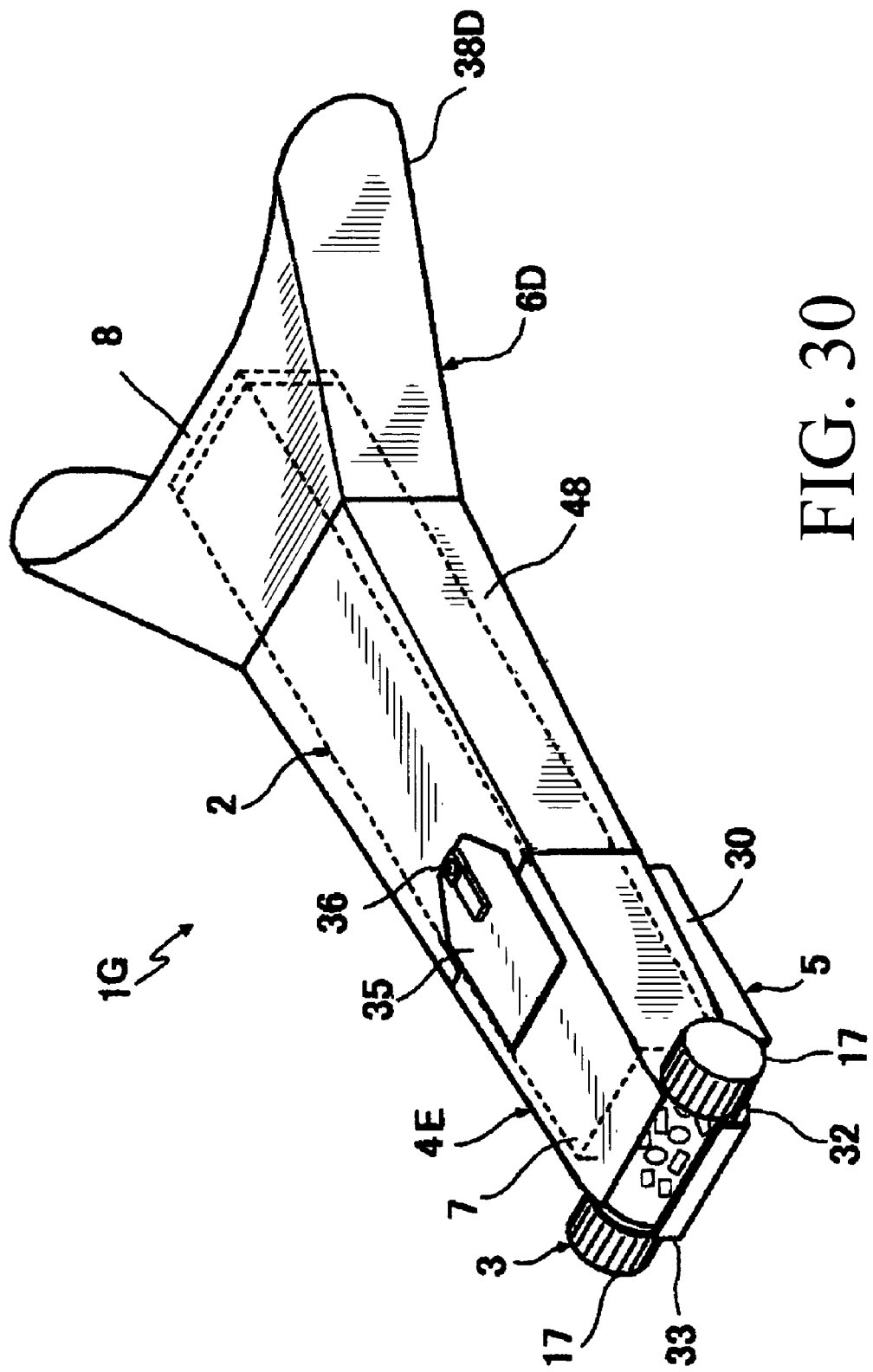
FIG. 30 is a perspective view showing an eighth embodiment.
Figure 31:
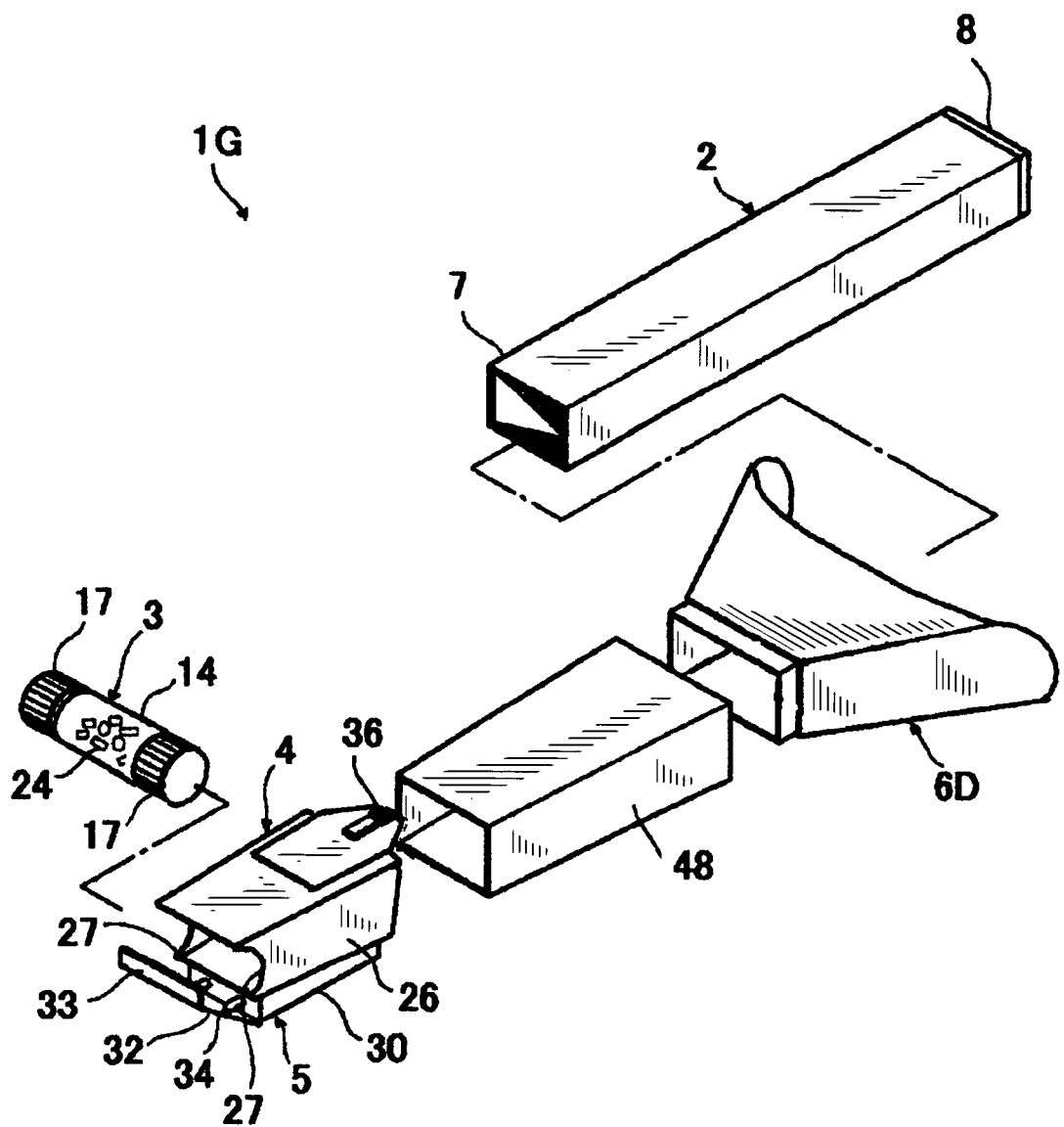
FIG. 31 is an exploded perspective view.
Figure 32:
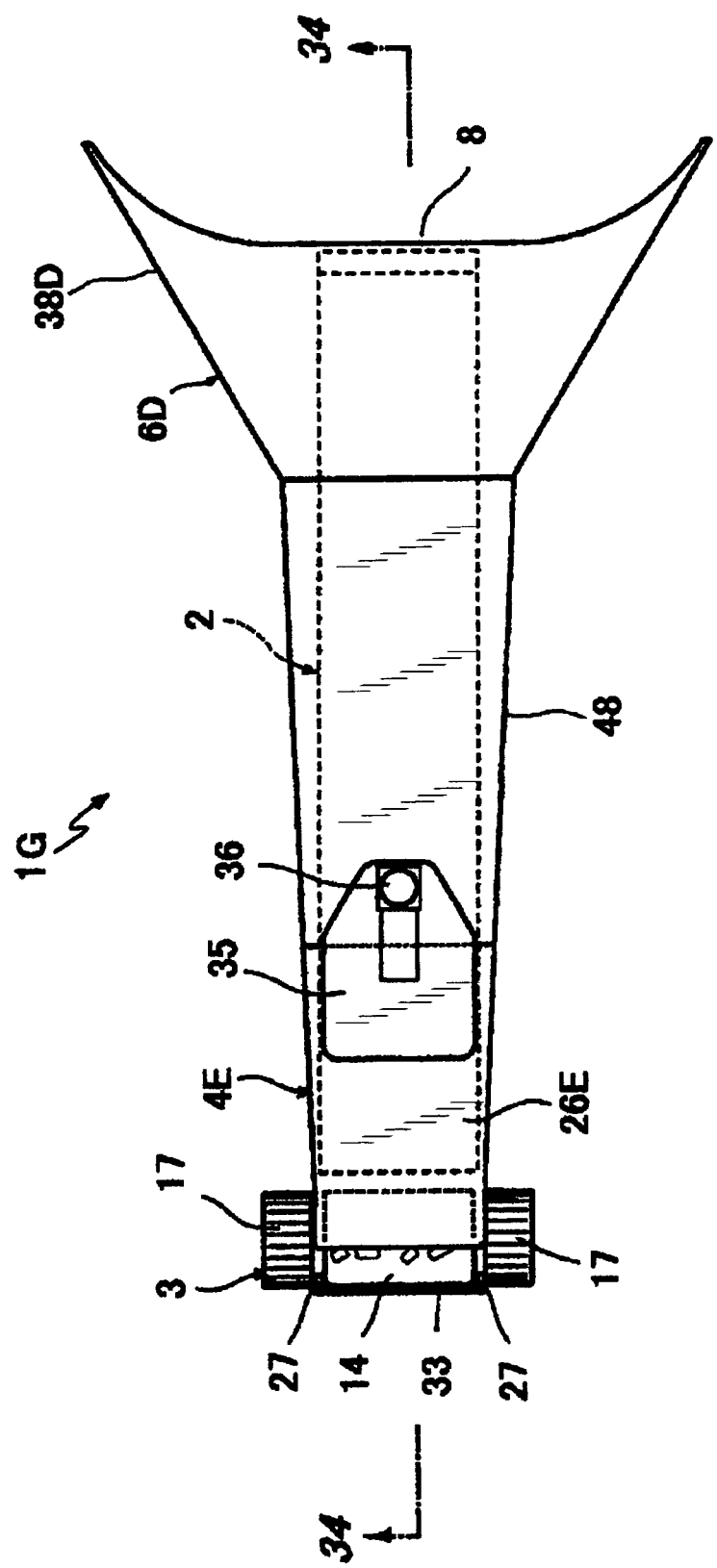
FIG. 32 is a top view.
Figure 33:
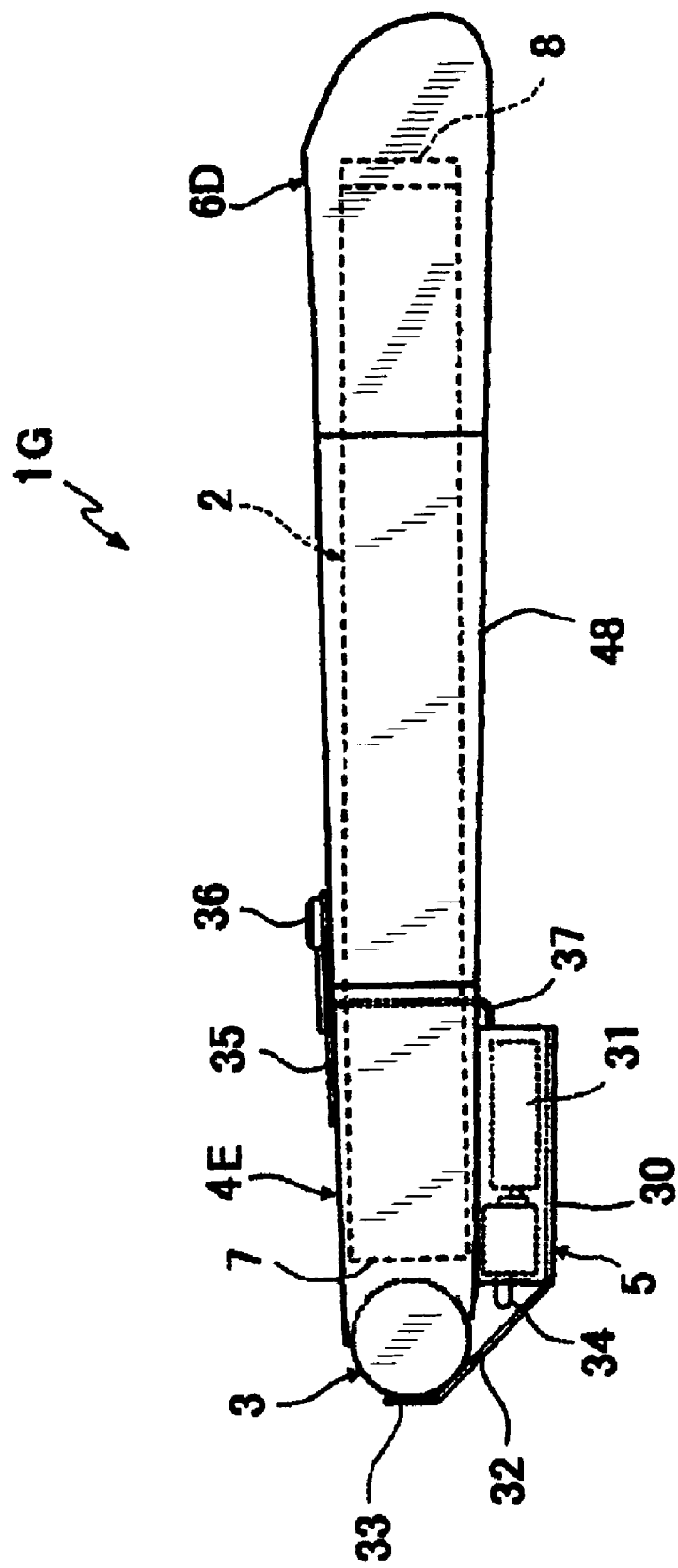
FIG. 33 is a side view.
Figure 34:
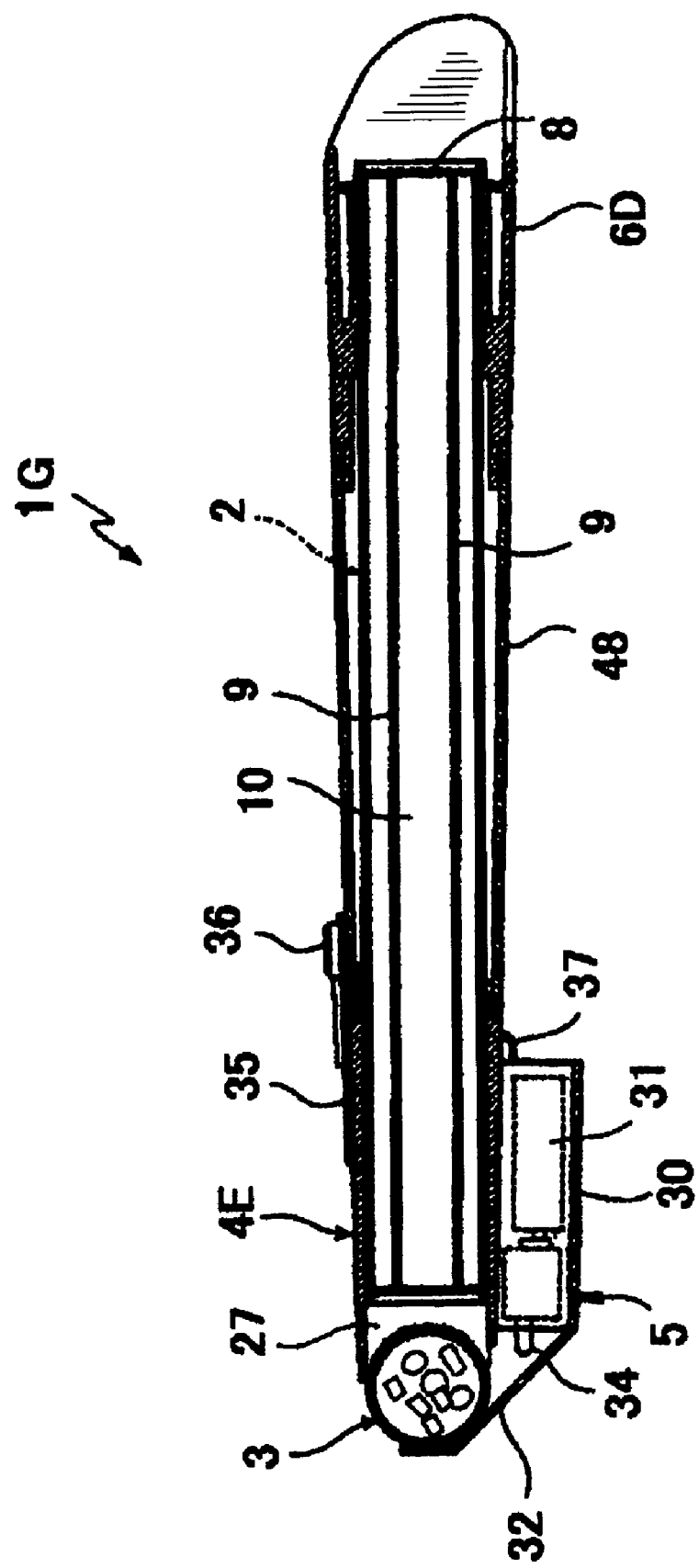
FIG. 34 is a cross sectional view taken along a line 34—34 of FIG. 32.

A seventh embodiment of the present invention is shown in FIGS. 28 and 29. It is distinguished from the first embodiment in that the support member 33 is replaced with another support member 33B having a transparent sheet 48, one end portion thereof attached to the bottom surface of the tip portion of the support body 4D and another end portion thereof having a fastener 47 which can adhere to the upper surface of the tip portion of the support body 4D. A kaleidoscope IF with the support member 33B according to the seventh embodiment has similar advantages to that according to the first embodiment.

An eighth embodiment of the present invention is shown in FIGS. 30–34. It is distinguished from the first embodiment in that the outer circumferential part of the kaleidoscope body 2 is covered by an outer case 48 for an ornament. A kaleidoscope 1G according to the eighth embodiment has similar advantages to that according to the first embodiment and the design may be changed.

Figure 35:
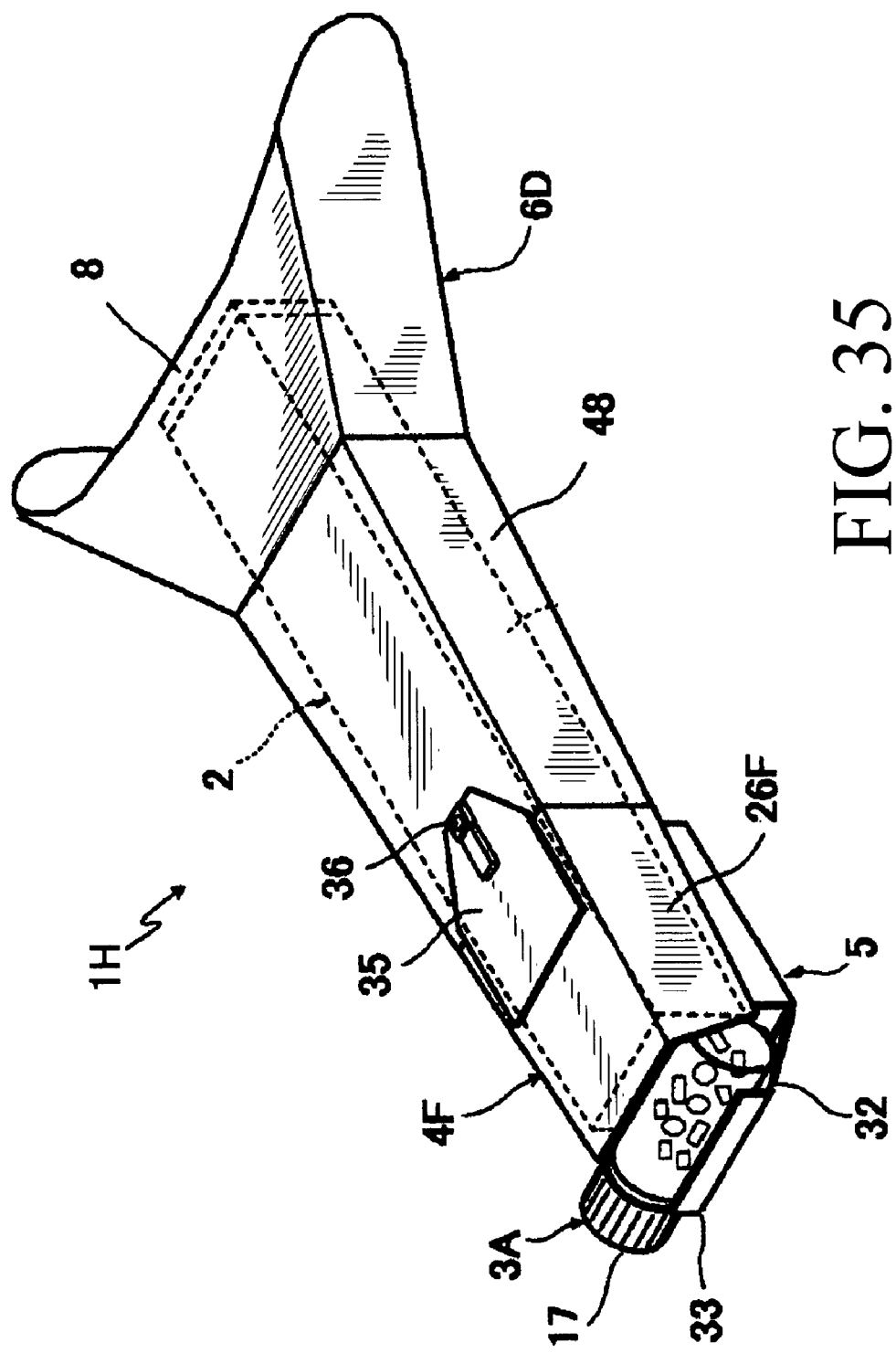
FIG. 35 is a perspective view showing a ninth embodiment.
Figure 36:
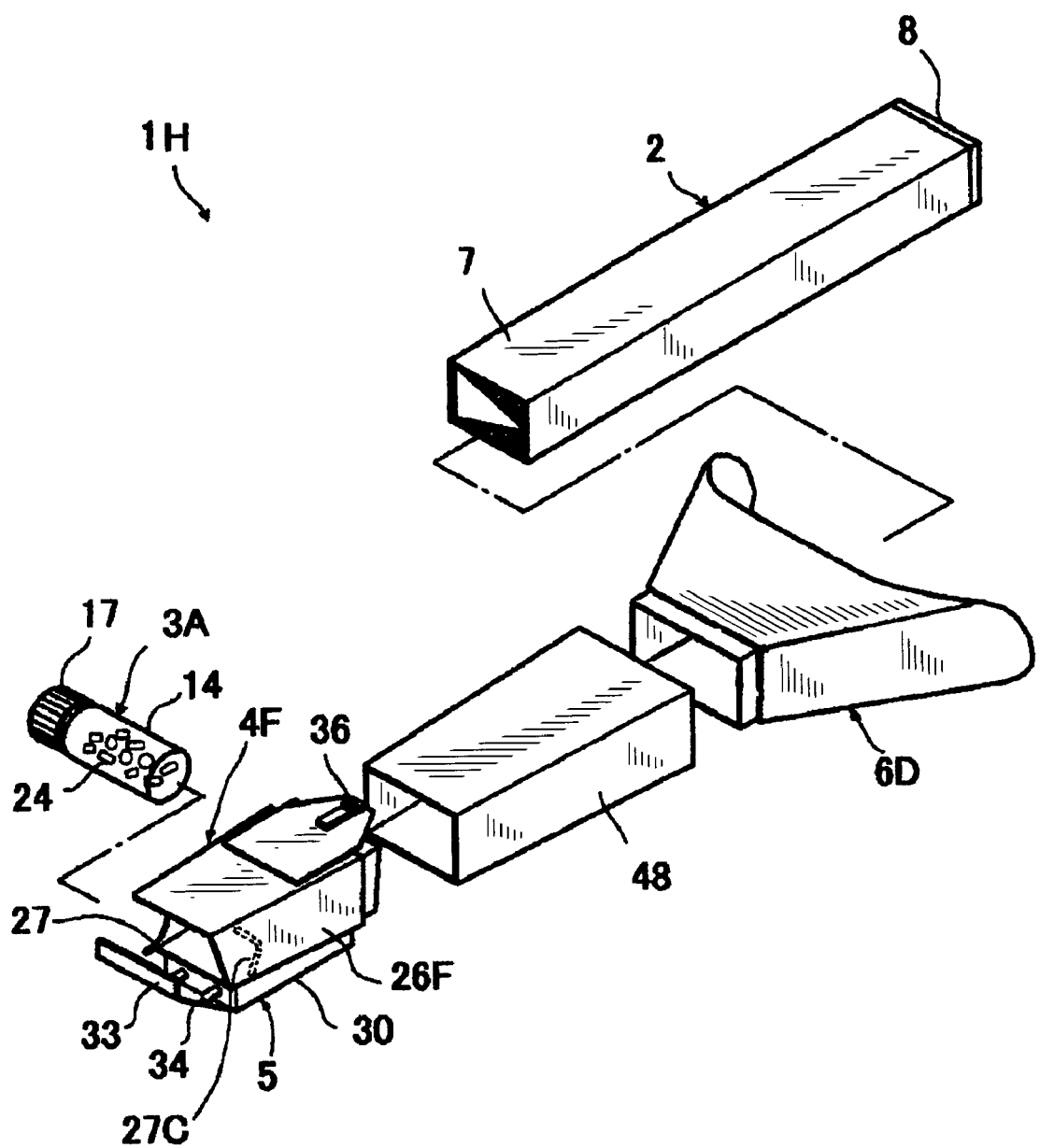
FIG. 36 is an exploded perspective view.
Figure 37:
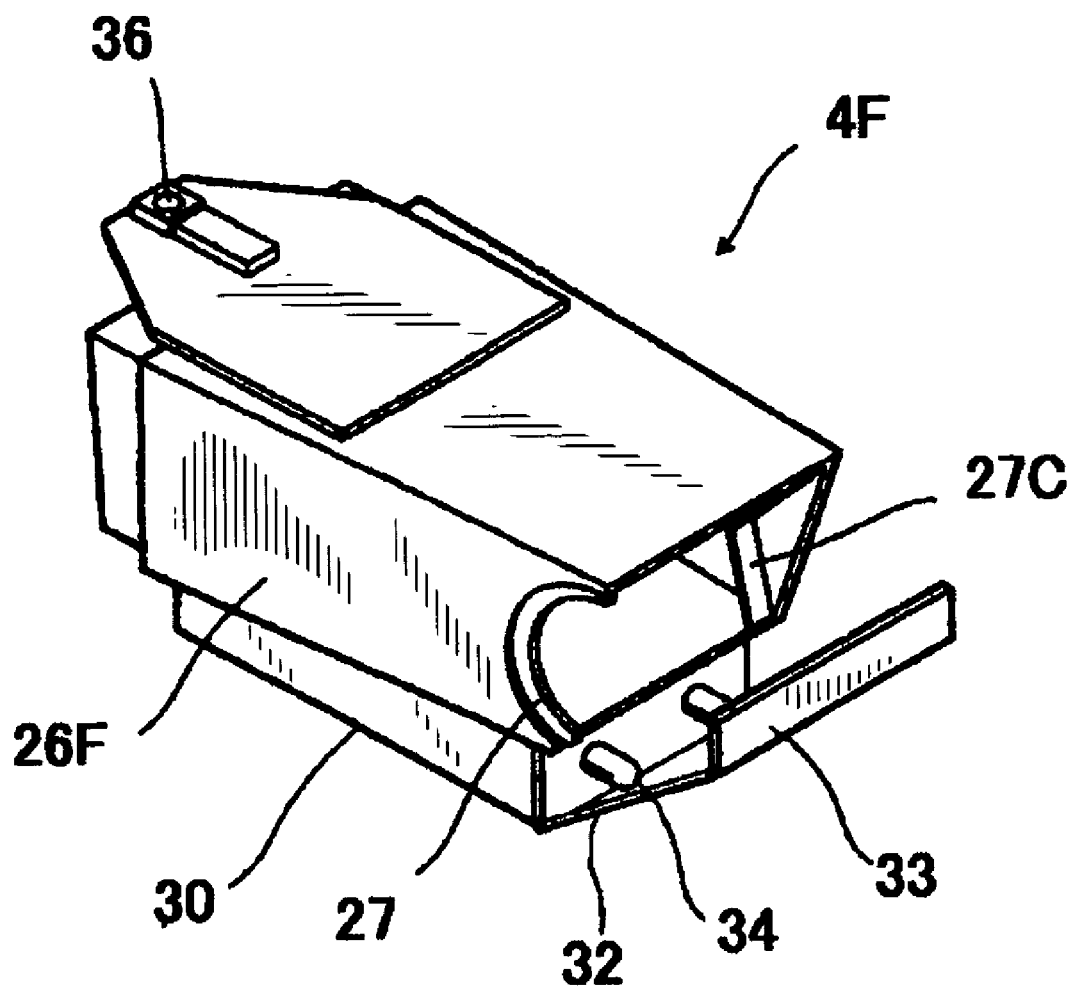
FIG. 37 is a perspective view of a support body for the image material assembly.

A ninth embodiment of the present invention is shown in FIGS. 35–37. It is distinguished from the first embodiment in that an image material assembly 3A has the cap 17 on one side. A support body 4F includes the concave part 27 which engages with the guide slot 19 formed in a part of the cap 17 of the image material assembly 3A and a concave part 27C formed in the shape of a V-letter, engaging with a bottom part of the image software 3A. The end portion of the kaleidoscope body 2 supports the image material assembly 3A rotatably and detachably. A kaleidoscope 1H with the concave parts 27, 27C according to the ninth embodiment has similar advantages to that according to the first embodiment.

Figure 38:
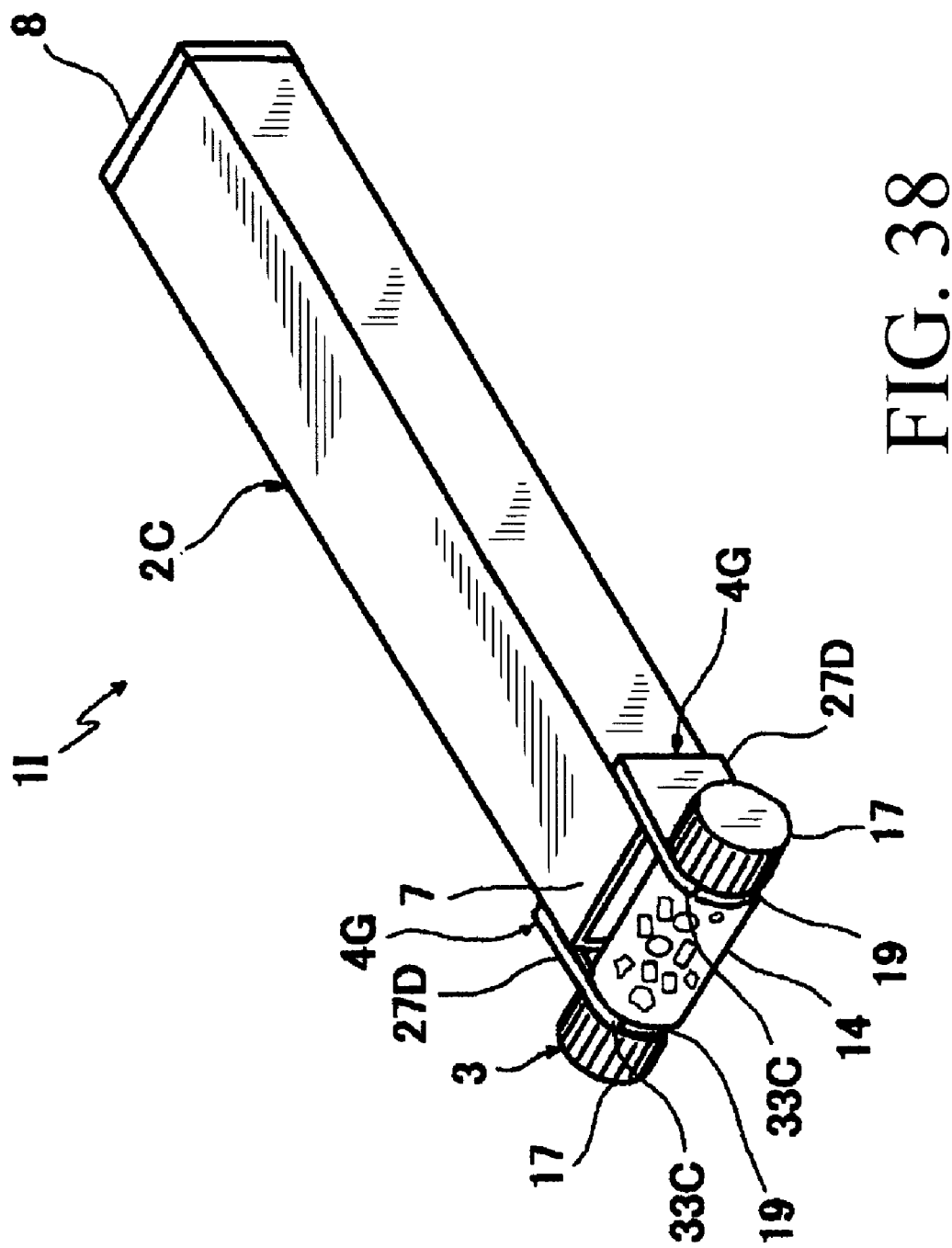
FIG. 38 is a perspective view showing a tenth embodiment.
Figure 39:
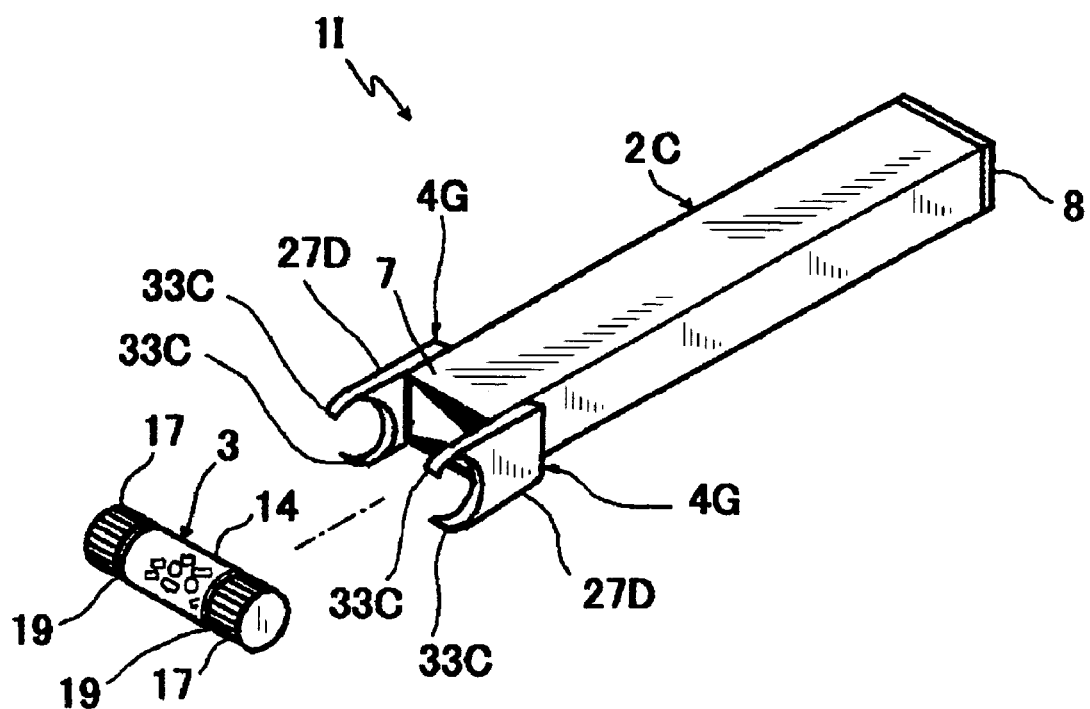
FIG. 39 is an exploded perspective view.

A tenth embodiment of the present invention is shown in FIGS. 38 and 39. It is distinguished from the first embodiment in that a pair of elastic support members 33C, 33C are attached to the opening of a concave part 27D so as to narrow the interval from the outer diameter of the image material assembly 3 in order to prevent from escaping the image software 3 from the concave part 27D. Therefore, the image material assembly 3 is supported by the concave parts 27D, 27D. Moreover, the concave parts 27D, 27D are attached to the end portion 7 of a kaleidoscope body 2C, and a support body 4G is assembled.

In order to insert the image material assembly 3 in the support body 4, the image material assembly 3 opens the opening of the pair of the support members 33C, 33C with elasticity, and the image material assembly 3 is put thereinto. Then the guide slots 19, 19 are engaged with the concave parts 27 respectively. Thereby, the image material assembly 3 can be rotated at a fixed position on the concave part 27, and it does not release from an open end. A kaleidoscope 1I according to the tenth embodiment has similar advantages to that according to the first embodiment.

As set forth above, the advantages of the invention are as follows:

(1) A kaleidoscope includes a kaleidoscope body assembled in the shape of a sleeve so as to locate a plurality of surfaces of mirrors thereinto; a support body attached to an end portion of the kaleidoscope body, supporting rotatably and detachably an image software at the end portion, having two concave parts which support ends of a container, formed in the shape of a cylinder, of the image material assembly and opens at one end, holding at least two points of the outer circumferential portion of the container; a prevention member attached to one of the support body, the end portion of the kaleidoscope body and a part adjacent the support body and kaleidoscope body, preventing coming out the image material assembly from an opening end of the concave parts; and the image material assembly including a container having an image material assembly member thereinto, being supported rotatably and detachably by the support body so that the support body can support detachably the image material assembly easily.

Thereby, since the image material assembly 3 can be detached and attached by one-touch, it is easy to exchange of the image material assembly which was trouble conventionally so that the user can exchange many image material assembly 3 and can enjoy easily.

(2) As discussed above, the form of the image material assembly for the kaleidoscope can be made into the graceful design which is worthy appreciation even if it is independent.

(3) A kaleidoscope is provided comprising: a kaleidoscope body assembled in the shape of a sleeve so as to locate a plurality of surfaces of mirrors thereinto; a support body supporting an image material assembly at an end portion of the kaleidoscope body; the image material assembly including a container having an image material medium; a lighting lamp irradiating in parallel to the axial direction of the kaleidoscope body; a reflective plate which bends the light of the lighting lamp to the image material assembly at a right-angled mostly to the axial direction of the kaleidoscope body; and a lighting device having an electric circuit, attached to one of the support body and the kaleidoscope body. This configuration has similar advantages to that according to the above-mentioned (1), and the bright and beautiful image also can be enjoyed with an easy posture.

(4) As discussed above (3), since it functions using the catoptrical light of the light input from a side portion to a sight line, shade arises on an image and there is a three-dimensional effect.

(5) As discussed above (3), since it functions using catoptrical light, an opaque object can be used, and the selection range of material increases, and the range of creation spreads.

(6) As discussed above (2), the light is illuminated from the surroundings to the whole container body, and the whole contents in the container body is watched transparently and beautifully even if the liquid is colored and is watched with penetration light. In addition, there are a few influences which the surface catoptrical light of the container body has on the image so that a clear image is obtained.

(7) As discussed above (3), the composition is simple, and a uniform soft light can illuminate throughout the irradiation side of the image material assembly. Also a beautiful image can be obtained.

(8) As discussed above (3), when the reflective part of the reflective plate is formed as a curved surface, it can work as a concave mirror, and the light of the lighting lamp can be efficiently collected, and the brightness of an image can be increased.

Moreover, the atmosphere of an image can be changed by making the surface of a reflective part a color white, or formed as a mirror surface and the like.

(9) As discussed above (3), since the upper surface of the reflective plate is opened, the natural light can be taken in when the surrounding situation is bright, and the battery economically is saved.

At this time, the reflective part of the reflective plate 32 works as a condensing mirror, and the taken-in light is efficiently brought together in the image material assembly 3, and it is effective in increasing the brightness of the image.

(10) As discussed above (3), the reflective plate can prevent sudden fall of the image material assembly when the image material assembly is installed and absorb the shock when the kaleidoscope body drops. Therefore, the image material assembly and the lighting lamp are protected from breakage.

(11) Since the white Light Emitting Diode with high luminosity is used for the lighting lamp, the white light of high color temperature is obtained, and a kaleidoscope image with beautiful color can be obtained.

(12) The invention still further provides a kaleidoscope comprising: a kaleidoscope body assembled in the shape of a sleeve so as to locate a plurality of surfaces of mirrors thereinto; a support body supporting an image material assembly at an end portion of the kaleidoscope body; the image material assembly including a container formed in the shape of a cylinder and an image material medium stored therein; and a reflective plate attached to one of the support body and the kaleidoscope body, filling a space between a cylindrical surface of the image material assembly and the end portion of the kaleidoscope body. This embodiment has similar advantages to that according to the above-mentioned (1) to (11), and blocks unrelated exterior scenery from being reflected, and the natural beautiful image is produced without noise around the image.

(13) The invention yet further provides a kaleidoscope comprising: a kaleidoscope body assembled in the shape of a sleeve so as to locate a plurality of surfaces of mirrors thereinto; a support body supporting an image material assembly at an end portion of the kaleidoscope body; the image material assembly including a container formed in the shape of a cylinder having an image material medium therein; and an eye cover attached to a window of the kaleidoscope body, capable of covering both eyes when the user is looking into the window by one eye. This embodiment has similar advantages to that according to the above-mentioned (1) to (12), even though the window of the kaleidoscope body is looked at by the right or left eye, the other one of the eyes is covered. Therefore, both eyes open and a three-dimensional effect is perceived and the eyes do not get tired.

(14) Another feature provided by the invention is that the eye cover includes a hood attached movably to the window of the kaleidoscope body so that a position of the hood can be changed to cover both eyes when the user is looking into the window using either one of the right or left eyes. this embodiment has similar advantages to that according to the above-mentioned (13).

(15) The invention further provides a kaleidoscope comprising: two kaleidoscope bodies arranged in parallel allowing viewing by both eyes, and assembled in the shape of a sleeve so as to locate a plurality of surfaces of mirrors thereinto; two support bodies attached in an end portion of the kaleidoscope bodies, supporting independently two image material assemblies corresponding to the kaleidoscope bodies; and the image material assemblies including a container supported by the support body, the container having image material mediums therein. This embodiment has similar advantages to that according to the above-mentioned (1) to (14), and the user can enjoy the image that is more complicated as a whole, deep, clear and has three-dimensional effect.

(16) The invention also provides the feature of an image material assembly for a kaleidoscope comprising: a container body formed in the shape of a cylinder; an image material medium including a plurality of objects and a liquid placed into the container body, elastic pieces put into the container body, contracting and expanding the volume by change of the pressure inside the container body; and a cap which covers an opening of the container body in a sealing state. In this embodiment formation of air bubbles in the image material assembly 3 is prevented, and a fine sight of the image can be secured.

Moreover, the quantity of the image material assembly medium 24 may be adjusted economically by packing the elastic pieces.

(17) As discussed above (16), leaking of the liquid can be controlled even if internal pressure is improved by the rise of temperature etc.

(18) Still further, the invention provides an image material assembly for a kaleidoscope comprising: a container body formed in the shape of a cylinder; a partition wall forming a plurality of spaces in a cylindrical container provided in the container body; an image material medium including a plurality of objects and a liquid disposed in the plurality of spaces; and a cap which covers an opening of the container body in a sealing state. In this embodiment, when the image material assembly is rotated, there is an advantage which gives a change to an image.

Moreover, the quantity of the image material assembly member may be adjusted economically.

What is claimed is:

1. A kaleidoscope comprising:
   a kaleidoscope body including mirror surfaces forming a reflecting tube which transmits a kaleidoscopic image therein and defines a kaleidoscope axis, said kaleidoscope body having first and second ends at opposing ends of said reflecting tube;
   an image material assembly including a cylinder containing materials for producing said kaleidoscopic image, the cylinder having first and second cylinder ends;
   a support body connected to a first end of said reflecting tube and having opposing first and second support members respectively having side edges defining first and second concave recesses each having an open side and into which the first and second cylinder ends are inserted and are rotatable and detachably supported; and
   a retention member, attached to one of the support body and said first end of the kaleidoscope body, engaging and biasing said cylinder into said first and second concave recesses to retain said cylinder in said first and second concave recesses.

2. A kaleidoscope comprising:
a kaleidoscope body including mirror surfaces forming a reflecting tube which transmits a kaleidoscopic image therein and defines a kaleidoscope axis, said kaleidoscope body having first and second ends at opposing ends of said reflecting tube;
an image material assembly including a cylinder containing materials for producing said kaleidoscopic image, the cylinder having first and second cylinder ends;
a support body connected to a first end of said reflecting tube and having opposing first and second support members respectively having side edges defining first and second concave recesses each having an open side and into which the first and second cylinder ends are inserted and are rotatably and detachably supported;
a retention member, attached to one of the support body and said first end of the kaleidoscope body, engaging and biasing said cylinder into said first and second concave recesses to retain said cylinder in said first and second concave recesses;
a light producing device connected to said kaleidoscope body and displaced axially in a direction of said kaleidoscope axis from a center axis of said cylinder; and
a reflective plate disposed outside of said tube defined by said plurality of mirrors and having a plane surface inclined with respect to said kaleidoscope axis to reflect light of the light producing device onto said cylinder containing said materials for producing said kaleidoscope image.

3. A kaleidoscope comprising:
a kaleidoscope body including mirror surfaces forming a reflecting tube which transmits a kaleidoscopic image therein and defines a kaleidoscope axis, said kaleidoscope body having first and second ends at opposing ends of said reflecting tube;
an image material assembly including a cylinder containing materials for producing said kaleidoscopic image, the cylinder having first and second cylinder ends;
a support body connected to said first end of said tube and having opposing first and second support members by which said first and second cylinder ends are rotatably and detachably supported;
a light producing device connected to said kaleidoscope body and displaced axially in a direction of said kaleidoscope axis from a center axis of said cylinder; and
a reflective panel disposed outside of said reflecting tube and inclined with respect to said kaleidoscope axis to reflect light of the light producing device onto said cylinder containing said materials for producing said kaleidoscope image.

4. A kaleidoscope according to claim 3 wherein said light producing device is outside of said kaleidoscope body.

5. A kaleidoscope according to claim 4 wherein said light producing device is connected to said kaleidoscope body via said support body.

6. A kaleidoscope according to claim 5 wherein said reflective panel reflects the light in a direction oriented substantially at a right angle to said kaleidoscope axis and onto said cylinder.

7. A kaleidoscope according to claim 3 wherein said reflective panel reflects the light in a direction oriented substantially at a right angle to said kaleidoscope axis and onto said cylinder.

8. A kaleidoscope comprising:
a kaleidoscope body including mirror surfaces forming a reflecting tube which transmits a kaleidoscopic image therein and defines a kaleidoscope axis, said kaleidoscope body having first and second ends at opposing ends of said reflecting tube;
an image material assembly including a cylinder containing materials for producing said kaleidoscopic image;
a support body attached to said first end of said reflecting tube and supporting said cylinder apart from said first end of said kaleidoscope body; and
a reflective plate attached to one of the support body and the kaleidoscope body, said reflective plate extending to fill a space between a cylindrical surface of said cylinder and an end portion of said first end of said kaleidoscope body.

9. A kaleidoscope according to claim 8, further comprising:
a light producing device connected to said kaleidoscope body and displaced axially in a direction of said kaleidoscope axis from said cylinder; and
a reflective panel disposed outside of said reflecting tube and inclined with respect to said kaleidoscope axis to reflect light of the light producing device onto said cylinder containing said materials for producing said kaleidoscopic image.

10. A kaleidoscope comprising:
a kaleidoscope body including mirror surfaces forming a reflecting tube which transmits a kaleidoscopic image therein and defines a kaleidoscope axis, said kaleidoscope body having first and second ends at opposing ends of said reflecting tube;
an image material assembly including a cylinder containing materials for producing said kaleidoscopic image;
a support body attached to said first end of the tube and supporting said cylinder apart from said first end of said kaleidoscope body;
a window mounted at the second end of the kaleidoscope body through which said kaleidoscopic image is viewed; and
an eye cover mounted over said window of the kaleidoscope body and configured to extend in left and right directions to cover both eyes of a viewer of said kaleidoscopic image when viewing said kaleidoscopic image through said window using one of said eyes.

11. The kaleidoscope according to claim 10, wherein said eye cover includes a hood attached movably to said kaleidoscope body to move between first and second positions respectively permitting covering of both the eyes when the user is looking into the window using a right eye or a left eye of the eyes.

12. The kaleidoscope according to claim 11, wherein said hood attached movably to pivot with respect to said kaleidoscope body between said first and second positions.

13. The kaleidoscope according to claim 11, wherein said hood attached movably to slide with respect to said kaleidoscope body between said first and second positions in a direction orthogonal to said kaleidoscope axis.

* * * * *